US010719742B2

(12) United States Patent
Shechtman et al.

(10) Patent No.: US 10,719,742 B2
(45) Date of Patent: Jul. 21, 2020

(54) IMAGE COMPOSITES USING A GENERATIVE ADVERSARIAL NEURAL NETWORK

(71) Applicant: Adobe Inc., San Jose, CA (US)

(72) Inventors: Elya Shechtman, Seattle, WA (US); Oliver Wang, Seattle, WA (US); Mehmet Yumer, San Jose, CA (US); Chen-Hsuan Lin, Pittsburgh, PA (US)

(73) Assignee: ADOBE INC., San Jose, CA (US)

( * ) Notice: Subject to any disclaimer, the term of this patent is extended or adjusted under 35 U.S.C. 154(b) by 240 days.

(21) Appl. No.: 15/897,910

(22) Filed: Feb. 15, 2018

(65) Prior Publication Data

US 2019/0251401 A1 Aug. 15, 2019

(51) Int. Cl.
*G06K 9/66* (2006.01)
*G06N 3/04* (2006.01)
*G06N 3/08* (2006.01)

(52) U.S. Cl.
CPC ............... *G06K 9/66* (2013.01); *G06N 3/04* (2013.01); *G06N 3/088* (2013.01)

(58) Field of Classification Search
None
See application file for complete search history.

(56) References Cited

PUBLICATIONS

Vondrick, Carl, Hamed Pirsiavash, and Antonio Torralba. "Generating videos with scene dynamics." Advances In Neural Information Processing Systems. 2016. (Year: 2016).*

Carroll, Robert, Aseem Agarwala, and Maneesh Agrawala. "Image warps for artistic perspective manipulation." ACM Transactions on Graphics (TOG). vol. 29. No. 4. ACM, 2010. (Year: 2010).*
Chen, Yu, et al. "Adversarial posenet: A structure-aware convolutional network for human pose estimation." Proceedings of the IEEE International Conference on Computer Vision. 2017. (Year: 2017).*
Jaderberg, Max, Karen Simonyan, and Andrew Zisserman. "Spatial transformer networks." Advances in neural information processing systems. 2015. (Year: 2015).*
Lin, Chen-Hsuan, et al. "St-gan: Spatial transformer generative adversarial networks for image connpositing." Proceedings of the IEEE Conference on Computer Vision and Pattern Recognition. 2018. (Year: 2018).*
M. Arjovsky, S. Chintala, and L. Bottou. Wasserstein gan. arXiv preprint arXiv:1701.07875, 2017.
S. Baker and I. Matthews. Lucas-kanade 20 years on: A unifying framework. International journal of computer vision, 56(3):221-255, 2004.

(Continued)

*Primary Examiner* — Michelle M Entezari
(74) *Attorney, Agent, or Firm* — Keller Jolley Preece

(57) ABSTRACT

The present disclosure relates to an image composite system that employs a generative adversarial network to generate realistic composite images. For example, in one or more embodiments, the image composite system trains a geometric prediction neural network using an adversarial discrimination neural network to learn warp parameters that provide correct geometric alignment of foreground objects with respect to a background image. Once trained, the determined warp parameters provide realistic geometric corrections to foreground objects such that the warped foreground objects appear to blend into background images naturally when composited together.

20 Claims, 24 Drawing Sheets

(56) References Cited

PUBLICATIONS

D. Berthelot, T. Schumm, and L. Metz. Began: Boundary equilibrium generative adversarial networks. arXiv preprint arXiv:1703.10717, 2017.
R. Carroll, A. Agarwala, and M. Agrawala. Image warps for artistic perspective manipulation. SIGGRAPH 2010, pp. 127:1-127:9, Jul. 2010.
J. Dai, H. Qi, Y. Xiong, Y. Li, G. Zhang, H. Hu, and Y. Wei. Deformable convolutional networks. arXiv preprint arXiv:1703.06211, 2017.
D. DeTone, T. Malisiewicz, and A. Rabinovich. Deep image homography estimation. arXiv preprint arXiv:1606.03798, 2016.
Y. Ganin, D. Kononenko, D. Sungatullina, and V. Lempitsky. Deepwarp: Photorealistic image resynthesis for gaze manipulation. In European Conference on Computer Vision, pp. 311-326. Springer, 2016.
I. Goodfellow, J. Pouget-Abadie, M. Mirza, B. Xu, D.Warde-Farley, S. Ozair, A. Courville, and Y. Bengio. Generative adversarial nets. In Advances in neural information processing systems, pp. 2672-2680, 2014.
I. Gulrajani, F. Ahmed, M. Arjovsky, V. Dumoulin, and A. Courville. Improved training of wasserstein gans. arXiv preprint arXiv:1704.00028, 2017.
B. K. Horn and B. G. Schunck. Determining optical flow. Artificial intelligence, 17(1-3):185-203, 1981.
P. Isola, J.-Y. Zhu, T. Zhou, and A. A. Efros. Image-to image translation with conditional adversarial networks. In IEEE Conference on Computer Vision and Pattern Recognition (CVPR), 2017.
M. Jaderberg, K. Simonyan, A. Zisserman, et al. Spatial transformer networks. In Advances in Neural Information Processing Systems, pp. 2017-2025, 2015.
W. Jakob. Mitsuba renderer, 2010. http://www.mitsuba-renderer.org.
X. Jia, B. De Brabandere, T. Tuytelaars, and L. V. Gool. Dynamic filter networks. In Advances in Neural Information Processing Systems, pp. 667-675, 2016.
A. Kanazawa, D. W. Jacobs, and M. Chandraker. Warpnet: Weakly supervised matching for single-view reconstruction. In Proceedings of the IEEE Conference on Computer Vision and Pattern Recognition, pp. 3253-3261, 2016.
W.-S. Lai, J.-B. Huang, N. Ahuja, and M.-H. Yang. Deep laplacian pyramid networks for fast and accurate superresolution. In IEEE Conference on Computer Vision and Pattern Recognition (CVPR), 2017.
C.-H. Lin and S. Lucey. Inverse compositional spatial transformer networks. In IEEE Conference on Computer Vision and Pattern Recognition (CVPR), 2017.
C.-H. Lin, R. Zhu, and S. Lucey. The conditional lucas & kanade algorithm. In European Conference on Computer Vision, pp. 793-808. Springer, 2016.
M.-Y. Liu, T. Breuel, and J. Kautz. Unsupervised image-to-image translation networks. arXiv preprint arXiv:1703.00848, 2017.
Z. Liu, P. Luo, X. Wang, and X. Tang. Deep learning face attributes in the wild. In Proceedings of International Conference on Computer Vision (ICCV), 2015.
B. D. Lucas and T. Kanade. An iterative image registration technique with an application to stereo vision. In Proceedings of the 7th International Joint Conference on Artificial Intelligence—vol. 2, IJCAI'81, pp. 674-679, 1981.
X. Mao, Q. Li, H. Xie, R. Y. Lau, Z. Wang, and S. P. Smolley. Least squares generative adversarial networks. arXiv preprint ArXiv:1611.04076, 2016.
C. Mei, S. Benhimane, E. Malis, and P. Rives. Homography based tracking for central catadioptric cameras. In Intelligent Robots and Systems, 2006 IEEE/RSJ International Conference on, pp. 669-674. IEEE, 2006.
E. Park, J. Yang, E. Yumer, D. Ceylan, and A. C. Berg. Transformation-grounded image generation network for novel 3d view synthesis. In IEEE Conference on Computer Vision and Pattern Recognition (CVPR), 2017.
D. Pathak, P. Krahenbuhl, J. Donahue, T. Darrell, and A. A. Efros. Context encoders: Feature learning by inpainting. In Proceedings of the IEEE Conference on Computer Vision and Pattern Recognition, pp. 2536-2544, 2016.
P. Perez, M. Gangnet, and A. Blake. Poisson image editing. In ACM Transactions on graphics (TOG), vol. 22, pp. 313-318. ACM, 2003.
A. Radford, L. Metz, and S. Chintala. Unsupervised representation learning with deep convolutional generative adversarial networks. arXiv preprint arXiv:1511.06434, 2015.
N. Silberman, D. Hoiem, P. Kohli, and R. Fergus. Indoor segmentation and support inference from rgbd images. Computer Vision—ECCV 2012, pp. 746-760, 2012.
S. Song, F. Yu, A. Zeng, A. X. Chang, M. Savva, and T. Funkhouser. Semantic scene completion from a single depth image. In IEEE Conference on Computer Vision and Pattern Recognition (CVPR), 2017.
Y.-H. Tsai, X. Shen, Z. Lin, K. Sunkavalli, X. Lu, and M.-H. Yang. Deep image harmonization. In IEEE Conference on Computer Vision and Pattern Recognition (CVPR), 2017.
C. Vondrick, H. Pirsiavash, and A. Torralba. Generating videos with scene dynamics. In Advances in Neural Information Processing Systems, pp. 613-621, 2016.
X. Wang, A. Shrivastava, and A. Gupta. A-fast-rcnn: Hard positive generation via adversary for object detection. arXiv preprint arXiv:1704.03414, 2017.
J. Wu, C. Zhang, T. Xue, B. Freeman, and J. Tenenbaum. Learning a probabilistic latent space of object shapes via 3d generative-adversarial modeling. In Advances in Neural Information Processing Systems, pp. 82-90, 2016.
X. Xiong and F. De la Torre. Supervised descent method and its applications to face alignment. In Proceedings of the IEEE conference on computer vision and pattern recognition, pp. 532-539, 2013.
X. Yan, J. Yang, E. Yumer, Y. Guo, and H. Lee. Perspective transformer nets: Learning single-view 3d object reconstruction without 3d supervision. In Advances in Neural Information Processing Systems, pp. 1696-1704, 2016.
R. Yeh, Z. Liu, D. B. Goldman, and A. Agarwala. Semantic facial expression editing using autoencoded flow. arXiv preprint arXiv:1611.09961, 2016.
Y. Zhang, S. Song, E. Yumer, M. Savva, J.-Y. Lee, H. Jin, and T. Funkhouser. Physically-based rendering for indoor scene understanding using convolutional neural networks. In IEEE Conference on Computer Vision and Pattern Recognition (CVPR), 2017.
J. Zhao, M. Mathieu, and Y. LeCun. Energy-based generative adversarial network. arXiv preprint arXiv:1609.03126, 2016.
T. Zhou, M. Brown, N. Snavely, and D. G. Lowe. Unsupervised learning of depth and ego-motion from video. arXiv preprint arXiv:1704.07813, 2017.
T. Zhou, S. Tulsiani, W. Sun, J. Malik, and A. A. Efros. View synthesis by appearance flow. In European Conference on Computer Vision, pp. 286-301. Springer, 2016.
J.-Y. Zhu, P. Krahenbuhl, E. Shechtman, and A. A. Efros. Learning a discriminative model for the perception of realism in composite images. In Proceedings of the IEEE International Conference on Computer Vision, pp. 3943-3951, 2015.
J.-Y. Zhu, P. Krahenbuhl, E. Shechtman, and A. A. Efros. Generative visual manipulation on the natural image manifold. In Proceedings of European Conference on Computer Vision (ECCV), 2016.
J.-Y. Zhu, T. Park, P. Isola, and A. A. Efros. Unpaired image-to-image translation using cycle-consistent adversarial networks. arXiv preprint arXiv:1703.10593, 2017.

\* cited by examiner

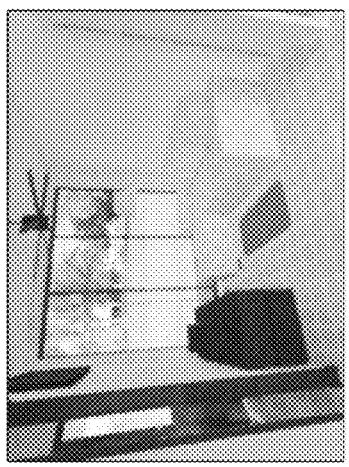
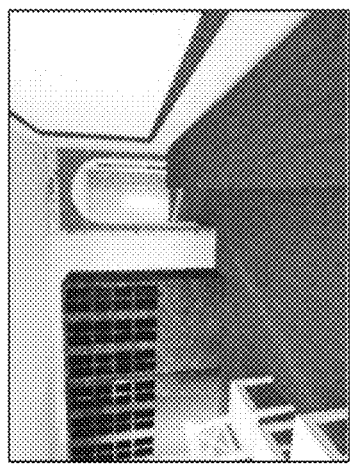
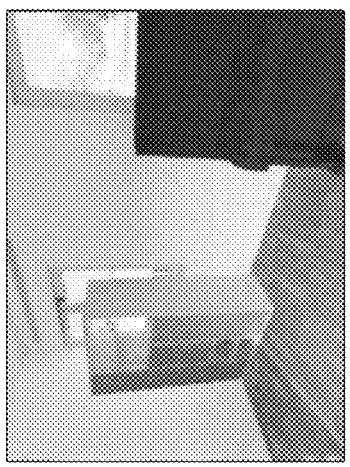
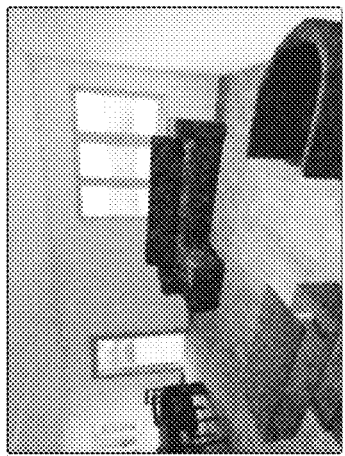
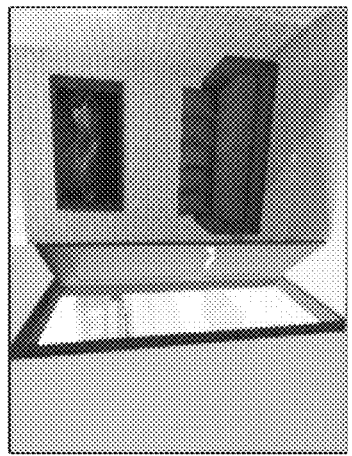
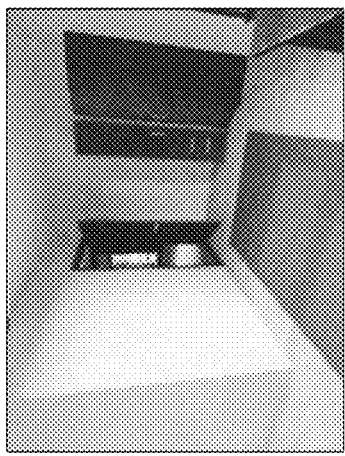
Ground Truth Composite Images 602
Fig. 6A

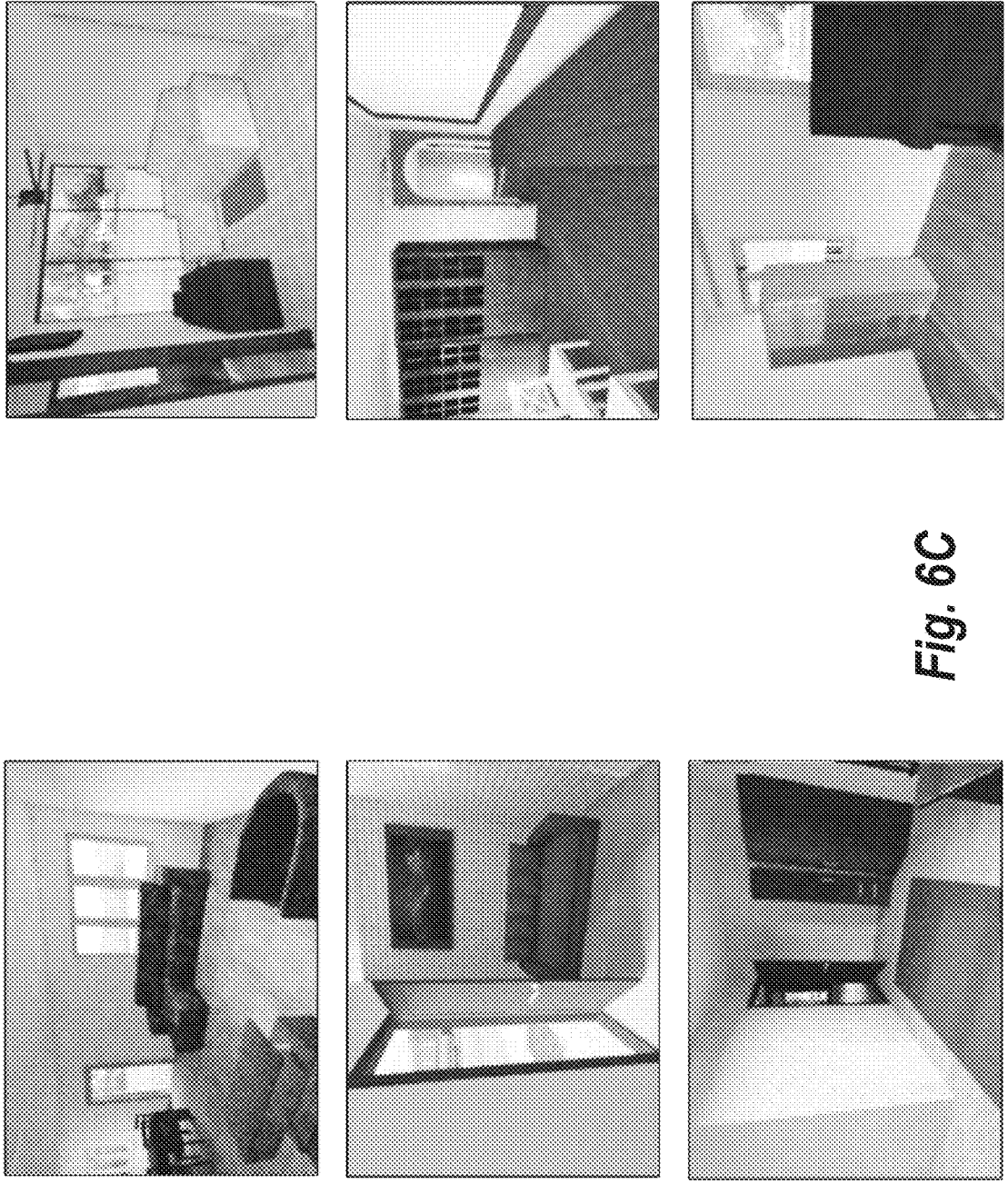

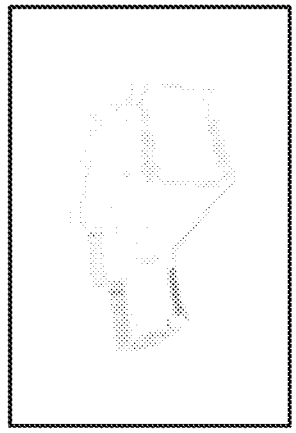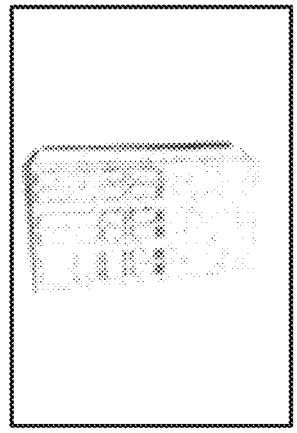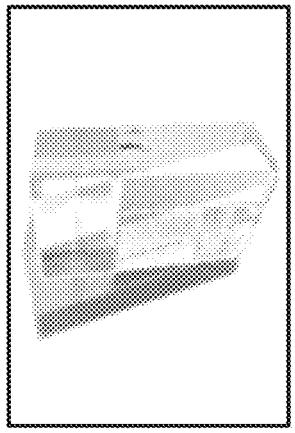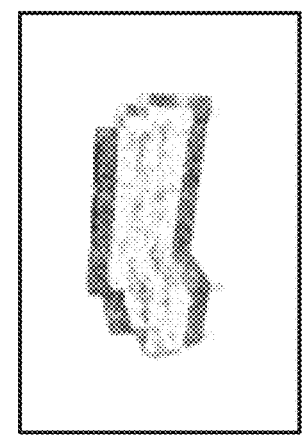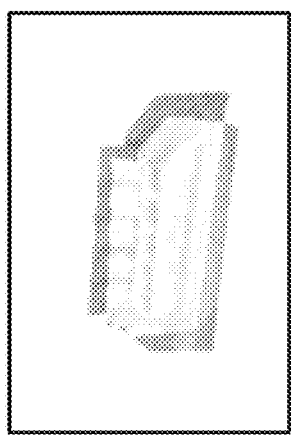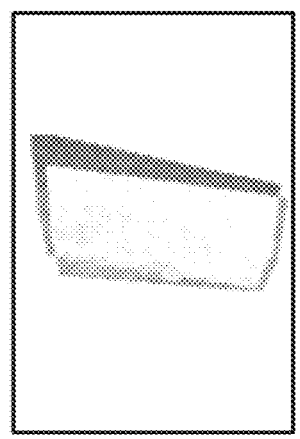
Fig. 6D

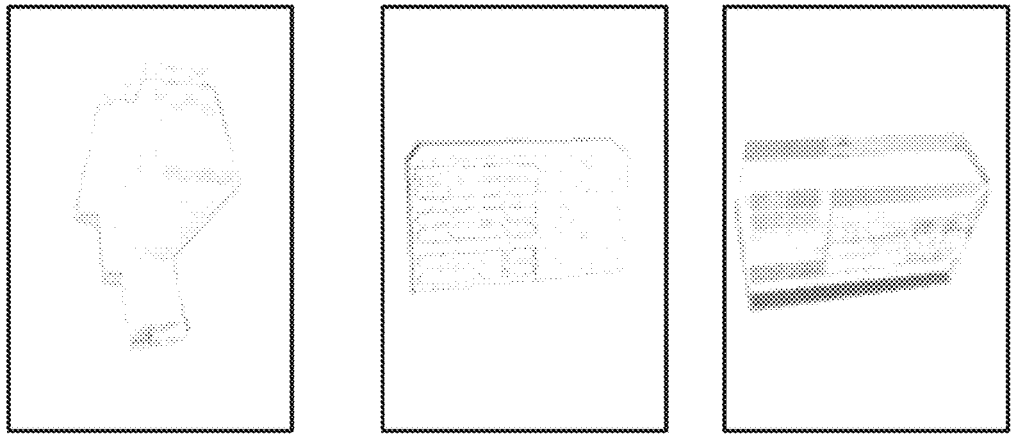
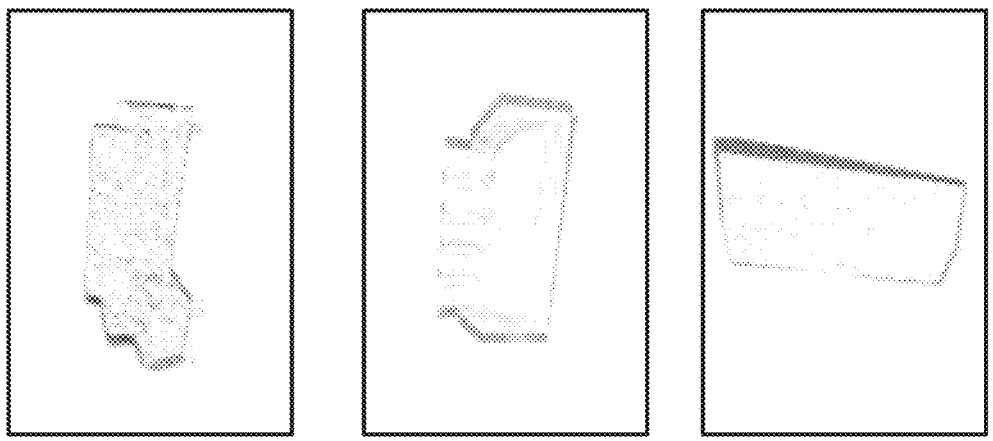
Residual Between Warped And Ground Truth 610
Fig. 6E

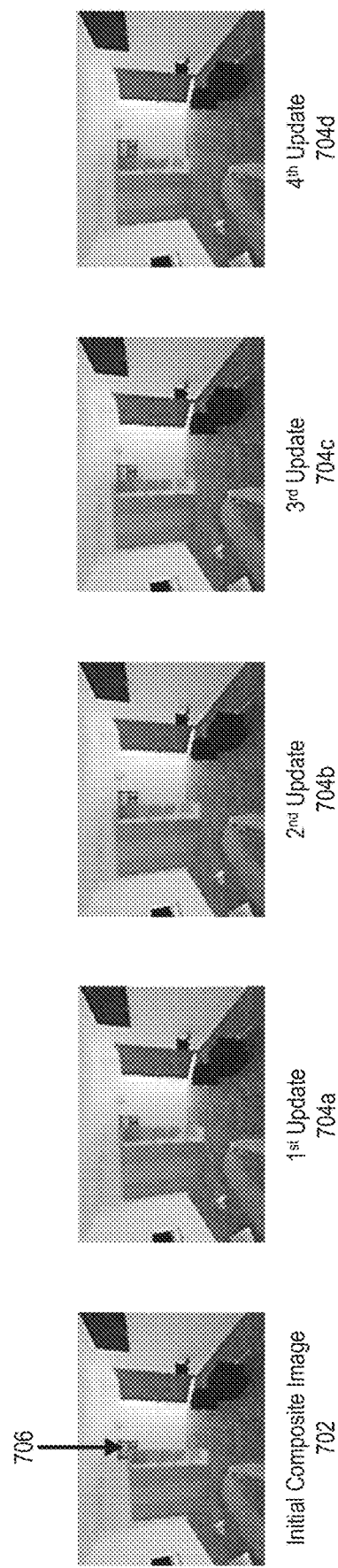

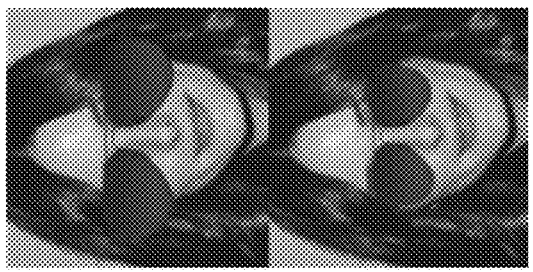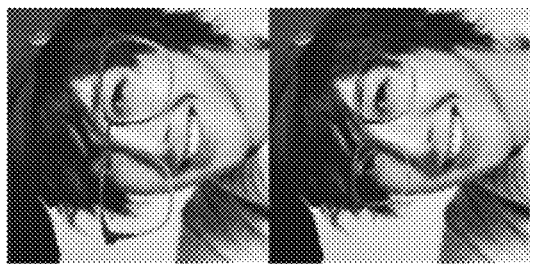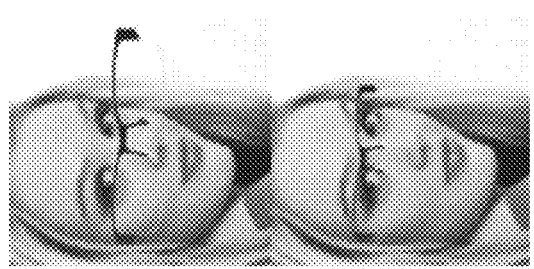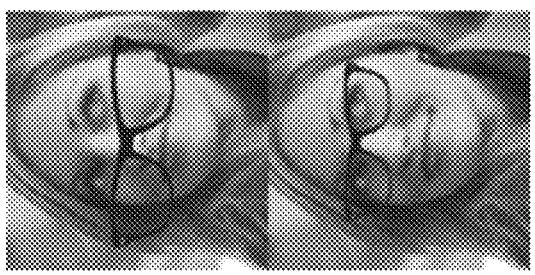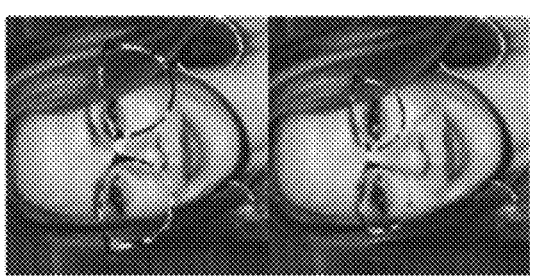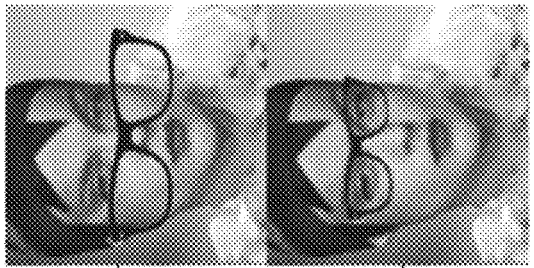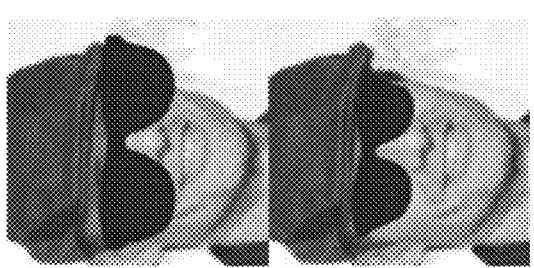
Fig. 8B

| Category | Initial warp | SDM | Direct Supervision | ST-GAN (non-seq.) | ST-GAN (warp 1) | ST-GAN (warp 2) | ST-GAN (warp 4) | ST-GAN (end-to-end) | Ground truth |
|---|---|---|---|---|---|---|---|---|---|
| Bed | 35.5 % | 30.5 % | 30.2 % | 32.8 % | 32.8 % | 46.8 % | 32.8 % | 32.2 % | 75.0 % |
| Bookshelf | 21.1 % | 33.9 % | 35.1 % | 16.7 % | 26.4 % | 26.2 % | 39.5 % | 42.6 % | 68.9 % |
| Cabinet | 20.9 % | 19.8 % | 35.0 % | 36.6 % | 14.3 % | 31.2 % | 44.4 % | 50.0 % | 74.3 % |
| Chair | 32.8 % | 36.8 % | 47.6 % | 50.9 % | 62.3% | 42.7 % | 50.0 % | 58.6 % | 68.7 % |
| Desk | 18.9 % | 13.1 % | 36.1 % | 35.4 % | 29.2 % | 29.0 % | 39.4 % | 40.7 % | 65.1 % |
| Dresser | 14.9 % | 18.6 % | 20.7 % | 16.7 % | 24.6 % | 27.4 % | 29.7 % | 48.4 % | 66.1 % |
| Refrigerator | 37.1 % | 21.4 % | 50.0 % | 37.7 % | 28.6 % | 47.1 % | 39.7 % | 51.7 % | 81.6 % |
| Sofa | 15.9 % | 31.0 % | 42.4 % | 28.9 % | 37.0 % | 54.9 % | 56.1 % | 51.8 % | 78.2 % |
| Average | 24.6 % | 25.6 % | 37.1 % | 31.9 % | 31.9 % | 38.2 % | 41.5 % | 47.0 % | 72.6 % |

Fig. 13

IMAGE COMPOSITES USING A GENERATIVE ADVERSARIAL NEURAL NETWORK

BACKGROUND

Recent years have seen increased attention in the area of image compositing—the process of overlaying a masked foreground image on top of a background image to form a new composite image. In general, compositing images can be difficult due the foreground object from one image coming from a different scene than the background image, which leads to conventional photo-editing systems creating inconsistent and unnatural composite images. Indeed, the often foreground object mismatch the background scene in ways that negatively affect the realism of the composite image. For instance, the foreground object can mismatch the background in both appearance (e.g., lighting, white balance, and shading) and geometric perspective (e.g., changes in camera viewpoint and object positioning).

Some photo-editing systems have focused on the task of improving the appearance of composite objects to enable users to create more-realistic looking image composites. In particular, these photo-editing systems have employed Poisson blending and deep learning approaches to automate appearance corrections (e.g., contrast and color saturation). However, these systems do not address the issue of geometric realism. Thus, many photo-editing systems still require a considerable amount of human intervention using photo-editing software. Further, because of the difficulty of understanding and applying proper geometric perspectives, even after human editing, traditional composite images often appear unnatural.

In addition to photo-editing systems, recent direct image generation systems have attempted to create composite images using direct image generation, which includes a pixel-level prediction. Not only do these recent direct image generation systems require large amounts of memory storage and increased processing resources, but these systems are also limited to specific restricted domains, such as creating composite images of faces. Further, these systems often operate at low resolutions due to large processing requirements and finite network capacities. Thus, even these recent direct image generation systems fall short of providing realistic image composites efficiently and efficiently.

These and other problems exist with regard to automatically generating realistic composite images.

SUMMARY

Embodiments of the present disclosure provide benefits and/or solve one or more of the foregoing or other problems in the art with systems, computer media, and methods for effectively generating composite images using a generative adversarial neural network. For example, the disclosed systems train a geometric prediction neural network, using an adversarial discrimination neural network, to generate warp parameters that provide correct geometric alignment of foreground objects with respect to a background image. In addition, the disclosed systems employ an adversarial discrimination neural network that distinguishes realistic images from non-realistic images to train the geometric prediction neural network. For instance, the disclosed systems generate a composite image that combines a foreground object (e.g., an image of the foreground object) with a background image using the determined warp parameters mentioned above. The disclosed systems then feed the composite image to the adversarial discrimination neural network to determine whether the composite image resembles a realistic image or appears unrealistic. Using the output of the adversarial discrimination neural network, the disclosed systems further train the geometric prediction neural network to determine updated warp parameters that result in a more-realistic composite image. For instance, the geometric prediction neural network trains until it produces composite images that consistently fool the adversarial discrimination neural network into classifying the composite images as real images. Once trained, the geometric prediction neural network can receive an image of a foreground object and a background image and generate a realistic composite image. For instance, the geometric prediction neural network determines warp parameters that modify the geometry of the foreground object image to align with the perspective of the background image.

While this summary refers to systems for simplicity, the summary also applies to certain disclosed methods and non-transitory computer readable media. The following description sets forth additional features and advantages of one or more embodiments of the disclosed systems, computer media, and methods. In some cases, such features and advantages will be obvious to a skilled artisan from the description or may be learned by the practice of the disclosed embodiments.

BRIEF DESCRIPTION OF THE DRAWINGS

The detailed description provides one or more embodiments with additional specificity and detail through the use of the accompanying drawings, as briefly described below.

FIGS. 6A-6E illustrate example images of perturbed, warped, and ground truth composite images along with corresponding residuals in accordance with one or more embodiments.

FIG. 7 illustrates example results of the generative adversarial network iteratively learning and applying warp parameters that are used in a composite image in accordance with one or more embodiments.

FIGS. 8A and 8B illustrate example image results of a generative adversarial network trained using unpaired training images in accordance with one or more embodiments.

FIGS. 13 and 14 illustrate results of the image composite system disclosed herein compared to conventional systems.

DETAILED DESCRIPTION

Figure 1:
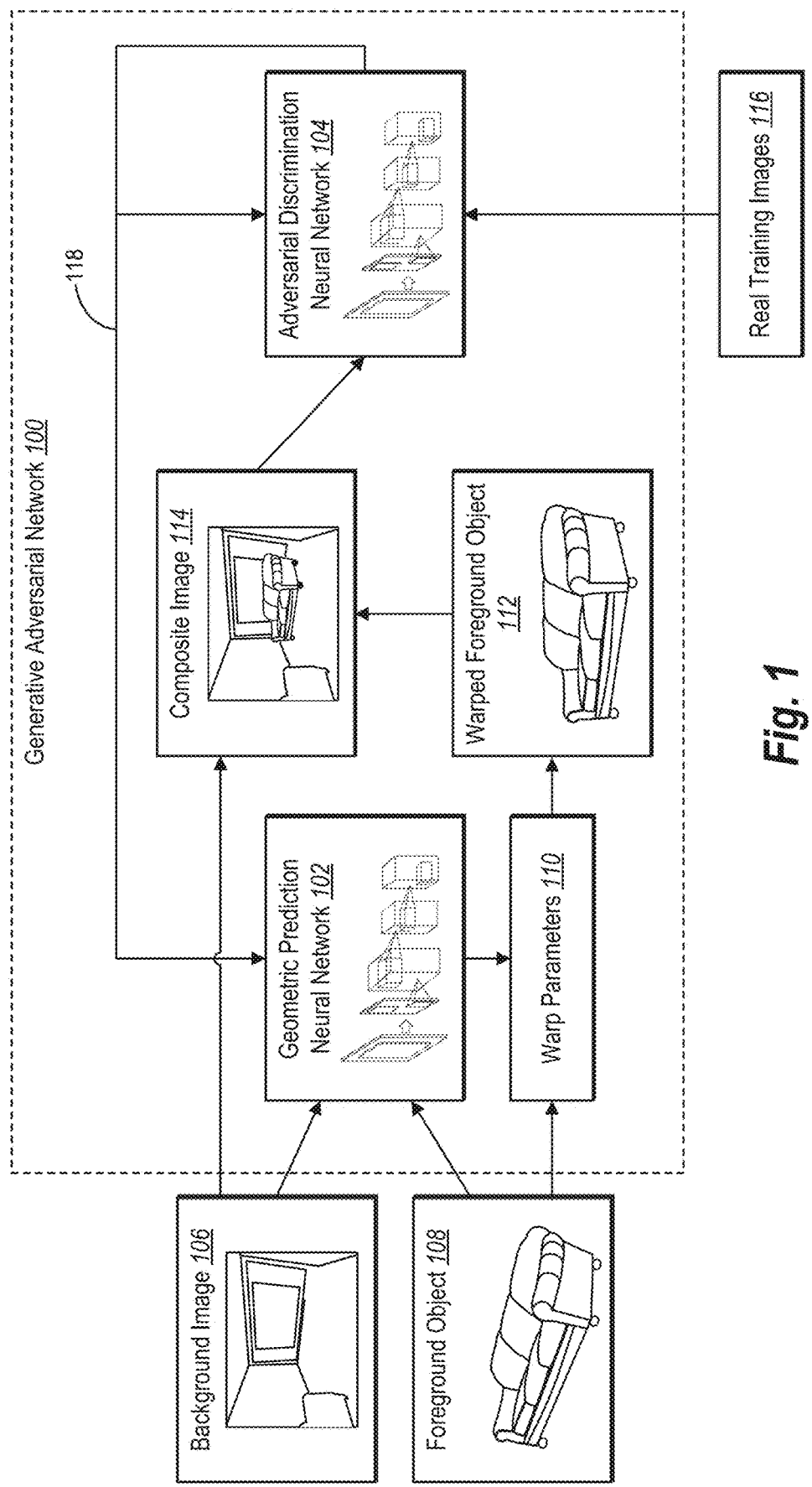
FIG. 1 illustrates a block diagram of an example generative adversarial network that includes a geometric prediction neural network and an adversarial discrimination neural network in accordance with one or more embodiments.

This disclosure describes one or more embodiments of an image composite system that employs a generative adversarial network to generate realistic composite images. In particular, the image composite system trains a geometric prediction neural network using an adversarial discrimination neural network to learn warp parameters that provide correct geometric alignment of foreground objects with respect to a background image. Once trained the generative adversarial network generates warp parameters that provide realistic geometric corrections for foreground objects such that they appear geometrically accurate when composited into background images.

To illustrate, in one or more embodiments, the image composite system generates a geometric prediction neural network that determines warp parameters for foreground images including foreground objects to be composited within background images. In addition, the image composite system employs an adversarial discrimination neural network that distinguishes realistic images from non-realistic (i.e., inaccurate looking) images to train the geometric prediction neural network to produce improved warp parameters. For instance, the image composite system generates a composite image that combines a foreground object (e.g., a foreground image that includes a corresponding segmentation object mask that isolates the foreground object within the image) with a background image using the determined warp parameters mentioned above. The image composite system then feeds the composite image to the adversarial discrimination neural network to determine whether the composite image resembles a realistic image or a non-realistic image. Using the output of the adversarial discrimination neural network, the image composite system further trains the geometric prediction neural network to determine warp parameters that result in realistic and natural looking composite images.

In one or more embodiments, the image composite system employs unsupervised training using real images of foreground objects naturally placed in backgrounds. For instance, the geometric prediction neural network serves as a geometric predictor and the adversarial discrimination neural network serves as a discriminator. The geometric predictor and the discriminator play a two-player game where the discriminator learns to distinguish between natural and composite images, and the geometric predictor learns warp parameters for foreground objects (e.g., a homography transformation matrix) such that the discriminator cannot tell composite images from natural images. By employing adversarial learning, the image composite system automatically generates, with little or no user involvement, composite images that resemble real and natural images.

The geometric prediction neural network and the adversarial discrimination neural network, in one or more embodiments, combine to form a generative adversarial neural network (or simply generative adversarial network (GAN)). In addition, in some embodiments, the generative adversarial network utilizes a spatial transformer network (STN) as the generator, which forms a spatial transformer-generative adversarial network (ST-GAN). The spatial transformer network, in various embodiments, is a type of convolutional neural network (CNN) capable of performing geometric transformations on images. Further, as described below, the image composite system employs an iterative warping scheme and sequential training to learn improved warp parameters.

As mentioned above, in various embodiments, the image composite system trains the geometric prediction neural network using the adversarial discrimination neural network. For instance, the adversarial discrimination neural network learns, based on real images, to determine whether an input image is a real image or a fake image. The image composite system provides composite images generated based on the warp parameters of the geometric prediction neural network to the adversarial discrimination neural network. If the adversarial discrimination neural network determines that the composite image is not a real image, it propagates back feedback to the geometric prediction neural network such that the geometric prediction neural network learns to determine more-realistic warp parameters. If the adversarial discrimination neural network determines that the composite image is real, it propagates back feedback to itself to better learn to identify composite images as non-real images. The image composite system can continue this sequential adversarial training strategy in an end-to-end manner to learn iterative spatial transformations (i.e., warp parameters) until the generative adversarial network converges.

In some embodiments, rather than employing the generative adversarial network mentioned above, the image composite system employs supervisory learning to train the geometric prediction neural network. For example, the image composite system generates or otherwise obtains a training set of images of foreground objects within background images as well as corresponding perturbed images having a perturbed object and/or perspective (e.g., perturbed images paired with the original images). The image composite system can train the geometric prediction neural network to generate warp parameters that align the foreground objects in the perturbed images consistently with the ground truth of the objects from the original images.

Once the geometric prediction neural network is trained, either using the unsupervised or supervised embodiments briefly described above, the image composite system can employ the geometric prediction neural network to generate composite images. For instance, the image composite system receives a foreground object image (e.g., an image that includes the foreground object) and a background image. In some instances, the image composite system also receives user input specifying the location of where to overlay the foreground object image over the background image. Using the trained geometric prediction neural network, the image composite system determines warp parameters from the foreground object image with respect to the perspective and orientation of the background image. In addition, the image composite system generates a composite image by applying the determined warp parameters to the foreground object image and composites the warped foreground object to the background image.

As previously mentioned, the image composite system provides numerous advantages and benefits over conventional systems. As an example, the image composite system automatically generates composite images that include geometrically correct spatial transformations of foreground objects without the need of user manipulation. Indeed, the image composite system generates natural and realistic looking composite images without the user having a thorough knowledge regarding geometric perspectives. Further, the image composite system is multi-modal, meaning that it can flexibly arrive at multiple solutions for the same foreground object and background image.

Additionally, the image composite system does not require manual annotations during training. For instance, when the image composite system learns from real images (e.g., unsupervised), the image composite system can train the geometric prediction neural network to provide composite images that follow the distribution and look of real images. In contrast, conventional systems require laborious manual annotations of spatial constraints such as vanishing points and guidelines.

As another benefit, the image composite system requires less storage and computational resources than conventional systems. For example, unlike conventional systems that perform pixel-level predictions for high-resolution images in high-dimensional space (e.g., generate image predictions), the image composite system learns homography transformations (i.e., warp parameters) in low-dimensional space—resulting in simpler, faster, and easier computations as well as less storage space. Indeed, the image composite system generates a set of low-dimensional warp parameter updates instead of whole high-resolution images. The generated warp parameters can be applied to low-resolution and high-resolution images alike without loss of quality or granularity. In this manner, the image composite system can composite foreground object images into existing background images obtained from various sources (e.g., downloaded from the Internet).

As further described below, the image composite system outperforms conventional systems in head-to-head evaluations with respect to generating natural looking composite images. Indeed, the image composite system improves current methods of generating realistic looking composite images. Additional results of testing and evaluating the image composite system are described below with respect to FIG. 13 and FIG. 14.

Additional advantages and benefits of the image composite system will become apparent in view of the following description. In particular, one or more embodiments of the image composite system will be described below with reference to one or more figures. In addition, the following definitions of terms will be used to describe one or more features of the image composite system.

As used herein, the term "image" or "digital image" refers to a digital graphics file that when rendered displays one or more objects. In particular, the term "image" can comprise a digital file that includes a foreground object and/or background scenery. Examples of images include foreground images and background images. For instance, foreground images include one or more foreground objects (also called foreground object images) and background images include background scenery. In addition, images can be real, where foreground objects are naturally placed in background scenery and captured together in the same image, or synthetic (e.g., composite image) where a computing device generates one or more objects or elements of the image. In some cases, a synthetic image can resemble a realistic image (e.g., appear as if it is a real image), as described below.

As mentioned, an image can be a composite image. As used herein, the term "composite image" refers to a digital image formed from two or more images. For example, a composite image includes a foreground object from a first image (real or synthetic) and a background from a second image (real or synthetic). In one or more embodiments, a geometric prediction neural network generates a composite image by compositing a foreground object (e.g., a foreground object image) into a background image.

In addition, the image composite system can generate a composite image based on an object segmentation mask corresponding to a foreground object. As used herein, the terms "object segmentation mask," "object mask," or simply "mask" refers to data (e.g., a file or layer) that isolates one or more objects of interest in an image from other portions of the image. For instance, when used herein, the term "foreground object" can refer to a portion of an image (e.g., a two-dimensional image) that includes a given object. An object segmentation mask can isolate or distinguish the portion of an image corresponding to foreground object from other portions of an image. For example, an object segmentation mask can comprise a map of an image that indicates which pixels of an image correspond to an object and which pixels do not.

In additional embodiments, the image composite system can generate images, such as when generating a training set of images, as further described below. For example, the image composite system generates a set of images that are analogous to real images with respect to the placement of foreground object images within backgrounds. Also, in some embodiments, the image composite system perturbs (e.g., modifies or changes) either foreground object images and/or the background perspectives to generate a second set of training images used for supervised machine learning. Alternatively, or additionally, the image composite system employs adversarial learning with real images, which allows for unsupervised machine learning.

As mentioned above, the image composite system employs machine learning and various neural networks. The term "machine learning," as used herein, refers to the process of constructing and implementing algorithms that can learn from and make predictions on data. In general, machine learning may operate by building models from example inputs (e.g., training), such as a training image set, to make data-driven predictions or decisions. In some example embodiments, machine learning is used for statistical pattern recognition, such as warp parameter learning, or learning features from images.

As used herein, the term "neural network" refers to a machine learning model that can be tuned (e.g., trained) based on inputs to approximate unknown functions. In particular, the term neural network can include a model of interconnected neurons that communicate and learn to approximate complex functions and generate outputs based on a plurality of inputs provided to the model. For instance, the term neural network includes one or more machine learning algorithms. In particular, the term neural network can include deep convolutional neural networks (i.e., "CNNs"), such as a spatial transformer network (STN). In addition, a neural network is an algorithm (or set of algorithms) that implements deep learning techniques that utilize the algorithm to model high-level abstractions in data. The description and figures below generally refer to a CNN, which includes lower layers, higher layers, and loss layers.

In one or more embodiments, the image composite system employs a geometric prediction neural network to determine warp parameters for foreground objects to be composited within background images. As used herein, the term "warp parameters" refers to a homograph transformation matrix that stores numerical values on how a given image (e.g., a foreground object image) is spatially transformed to change the perspective, orientation, size, position, and/or geometry of the object to better conform to a background image. In one or more embodiments, warp parameters are restricted to approximate geometric rectifications for objects that are mostly planar (e.g., in-planer modifications) or with small perturbations. In various embodiments, warp parameters also include a location (e.g., x, y coordinates) of a foreground object (e.g., the foreground object image) with respect to a background image.

As used herein, the term "adversarial learning" refers to a machine-learning algorithm (e.g., generative adversarial network or adversarial discrimination neural network) where opposing learning models are learned together. In particular, the term "adversarial learning" includes solving a plurality of learning tasks in the same model (e.g., in sequence or in parallel) while utilizing the roles and constraints across the tasks. In some embodiments, adversarial learning includes employing a minimax function (e.g., a minimax objective function) that both minimizes a first type of loss and maximizes a second type of loss. For example, the image composite system employs adversarial learning to minimize loss for generating warp parameters by a geometric prediction neural network and maximize discrimination of an adversarial discrimination neural network against non-realistic images generated by the geometric prediction neural network.

As mentioned above, the image composite system can combine the geometric prediction neural network and the adversarial discrimination neural network to form a generative adversarial network (GAN). In some embodiments, when the geometric prediction neural network determines warp parameters (e.g., spatial transformations), the generative adversarial network is a spatial transformer-generative adversarial network (ST-GAN).

Referring now to the figures, FIG. 1 illustrates a diagram of an example generative adversarial network 100 that includes a geometric prediction neural network 102 and an adversarial discrimination neural network 104. While FIG. 1 shows an embodiment of the generative adversarial network 100, alternative embodiments and configurations are possible. For example, in one or more embodiment the generative adversarial network 100 does not include an adversarial discrimination neural network 104, but rather employs a different type of loss function to train the geometric prediction neural network 102.

As shown, the generative adversarial network 100 includes the geometric prediction neural network 102. In many embodiments, the image composite system trains the geometric prediction neural network 102 to determine warp parameters for foreground objects (e.g., foreground object images) with respect to corresponding background images. For example, the image composite system provides the background image 106 and the foreground object 108 to the geometric prediction neural network 102. Using machine learning, the geometric prediction neural network 102 learns to determine warp parameters 110 for foreground objects such that the foreground object 108 appears to naturally fit in the background image 106. Indeed, the generative adversarial network 100 includes the geometric prediction neural network 102 outputting determined warp parameters 110 for the foreground object 108.

In some embodiments, the geometric prediction neural network 102 further determines the warp parameters based on an input location of the foreground object 108 relative to the background image 106. For example, depending on the location of the foreground object 108, the perspective of the background image 106 may change. Thus, in one or more embodiments, the geometric prediction neural network 102 further determines warp parameters for the foreground object 108 based on an initial or indicated location of the foreground object 108.

The image composite system can apply the warp parameters 110 to the foreground object 108 to generate a warped foreground object 112. For instance, the image composite system applies the homography spatial transformation indicated by the warp parameters 110 to the foreground object 108 to obtain the warped foreground object 112. Further, the image composite system can composite the warped foreground object 112 with the background image 106 to generate a composite image 114.

As part of training the geometric prediction neural network 102, the image composite system can verify that the warp parameters 110 are indeed transforming the foreground object 108 (e.g., the foreground object image that shows the foreground object) to geometrically align with the background image 106. When training is supervised, the image composite system can compare the warp parameters 110 to a set of paired images that include ground truth warp parameters and measure the difference between the two sets of parameters. This process is described further with respect to FIGS. 4 and 5.

Alternatively, when the training is unsupervised, as shown in FIG. 1, the image composite system determines the error loss of the warp parameters (e.g., how far off the warp parameters are from a real-world ground truth warp parameters) without paired images. As shown, the image composite system employs the adversarial discrimination neural network 104 to train the geometric prediction neural network 102. To illustrate, the image composite system feeds the composite image 114 to the adversarial discrimination neural network 104.

The image composite system can train the adversarial discrimination neural network 104 to classify images as real or fake (i.e., non-realistic). For example, in one or more embodiments, the image composite system trains the adversarial discrimination neural network 104 using real training images 116 to learn properties and characteristics of real images. For instance, the real training images 116 includes unannotated images obtained from an image repository and/or downloaded from the Internet that include objects naturally placed within background scenes. Once initially trained, the adversarial discrimination neural network 104 can receive images and classify the image as real or fake.

In addition, the image composite system can continue to train both the geometric prediction neural network 102 and the adversarial discrimination neural network 104 using the training images (e.g., real training images 116 and/or composite images). To illustrate, upon the adversarial discrimination neural network 104 classifying the composite image 114 as real or fake, the image composite system provides the classification in the form of feedback 118 to one or more of the geometric prediction neural network 102 and the adversarial discrimination neural network 104. In this manner, the feedback 118 indicates to the geometric prediction neural network 102 whether the warp parameters 110 fooled the adversarial discrimination neural network 104 into classifying the composite image 110 as a real image. If the geometric prediction neural network 102 did not fool the adversarial discrimination neural network 104, the image composite system can iteratively update the weights and parameters of the geometric prediction neural network 102 to determine more realistic warp parameters.

In addition, the image composite system can provide the feedback 118 to the adversarial discrimination neural network 104. In some embodiments, the feedback 118 includes an indication that the image is a composite image. Thus, if the adversarial discrimination neural network 104 classified the composite image 114 as real, the image composite system can update the weights and parameters to better classify composite images. Because the geometric prediction neural network 102 and the adversarial discrimination neural network 104 are competing with each other, the image composite system can take turns sequentially updating each network for a specified number of iterations, or until one or both networks converge (e.g., the generative adversarial network 100 converges).

Once trained, the image composite system can employ the generative adversarial network 100 to generate realistic composite images. For example, the image composite system provides a foreground object 108 (e.g., foreground object image) and a background image 106 (and an initial location in some embodiments) to the trained generative adversarial network 100. The geometric prediction neural network 102 determines warp parameters 110 for the foreground object 108 based on the background image 106 (and the location in select embodiments), applies the warp parameters 110 to the foreground object 108 to obtain a warped foreground object 112, and generates a composite image 114 using the warped foreground object 112 and the background image 106.

In one or more embodiments, the image composite system provides the composite image 114 as an output. In alternative embodiments, the image composite system verifies that the composite image 114 is realistic by feeding the composite image 114 to the adversarial discrimination neural network 104. If the adversarial discrimination neural network 104 classifies the composite image 114 as realistic (i.e., a real image), then the image composite system provides the composite image 114 as an output. Otherwise, the image composite system provides feedback 118 to the geometric prediction neural network 102 to generate updated warp parameters and generate an updated composite image. The image composite system can continue this process until the adversarial discrimination neural network 104 classifies the updated composite image as a real image.

Figure 2A:
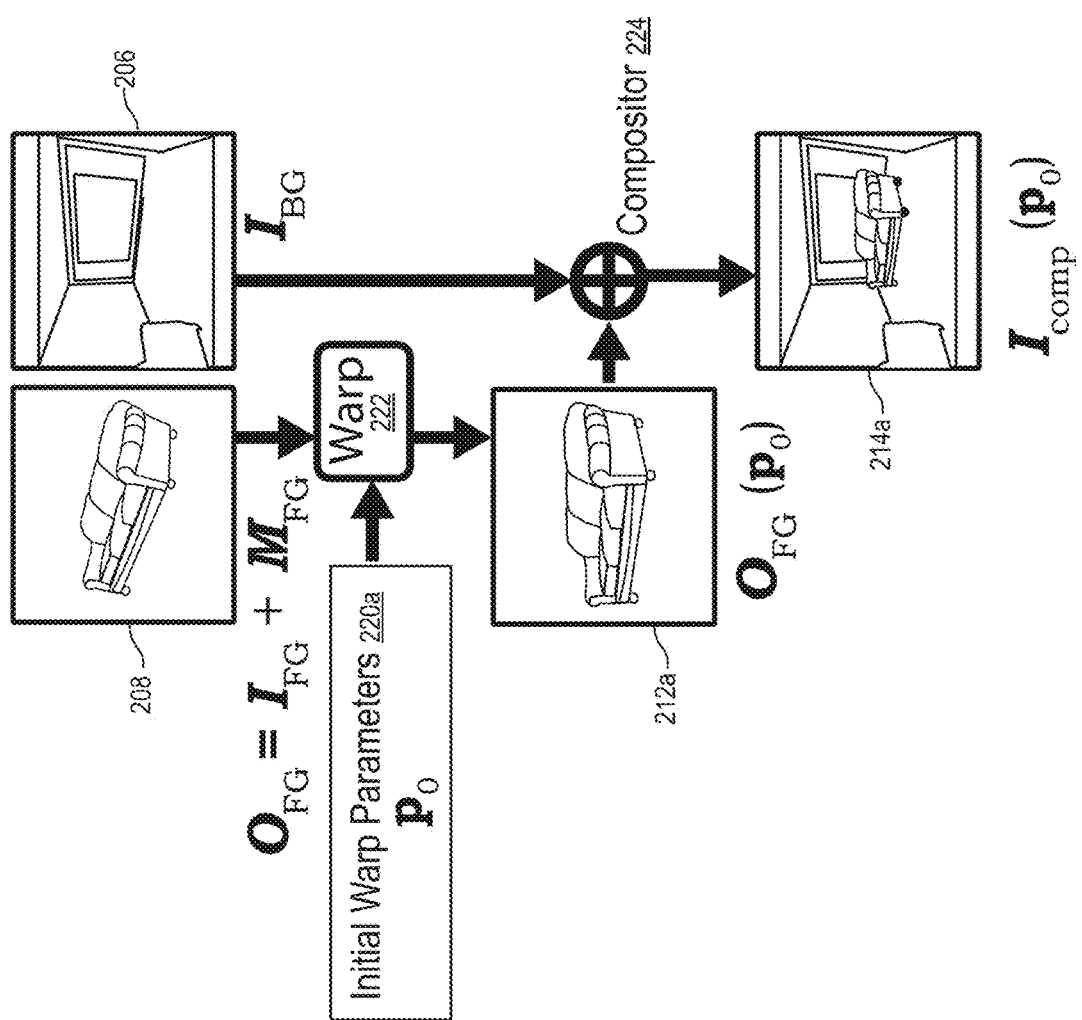
FIGS. 2A-2C illustrate diagrams of a more detailed process for training a generative adversarial network that includes a geometric prediction neural network and an adversarial discrimination neural network in accordance with one or more embodiments.
Figure 2B:
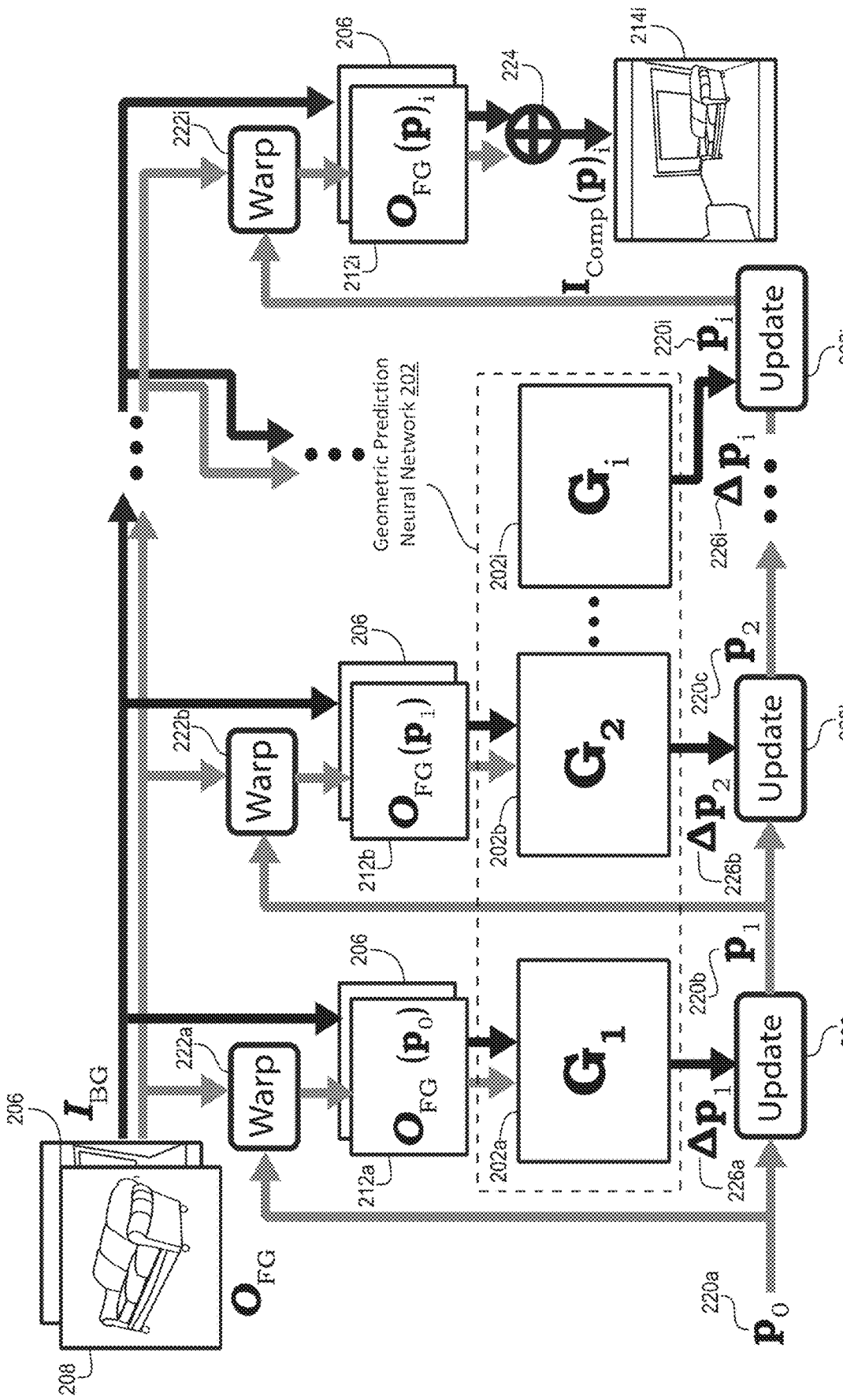
Figure 2C:
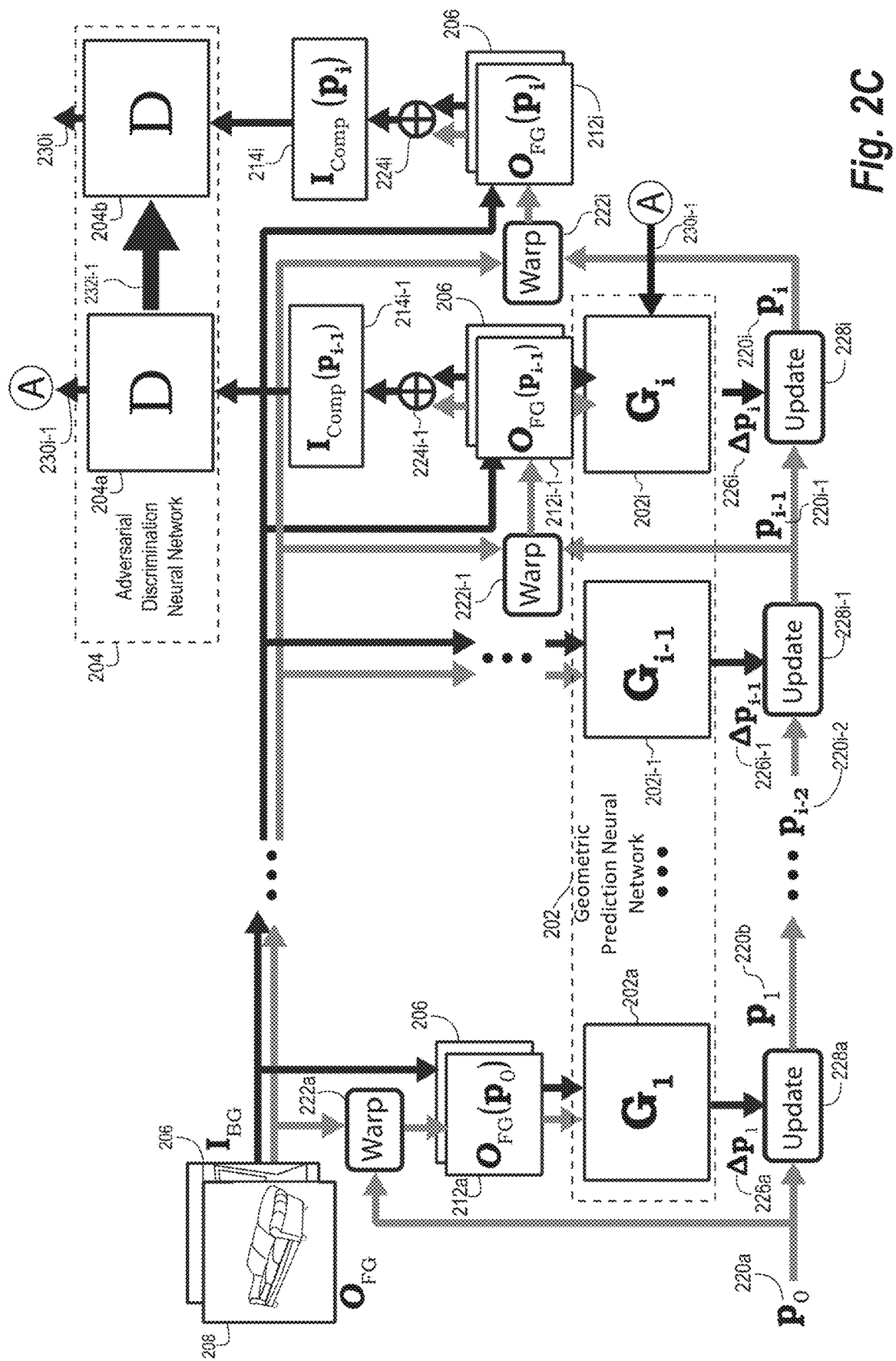

Additional disclosure regarding training the generative adversarial network is provided below. For instance, FIGS. 2A-2C illustrate diagrams of a more detailed process for training a generative adversarial network that includes a geometric prediction neural network and an adversarial discrimination neural network in accordance with one or more embodiments. In particular, FIG. 2A introduces components and terms used to describe generating a composite image using an initial set of warp parameters, FIG. 2B illustrates training the geometric prediction neural network to predict spatial transformations (i.e., warp parameters), and FIG. 2C illustrates using a discriminator (i.e., the adversarial discrimination neural network) to further train the geometric prediction neural network.

As mentioned previously, the image composite system predicts realistic geometric corrections for image composites given a background image and a foreground object image. Indeed, the image composite system aims to correct the camera perspective, position, and orientation of the foreground object such that the resulting composite image appears natural. To illustrate, FIG. 2A shows a foreground object 208 and a background image 206. The foreground object 208 is also labeled as $O_{FG}$, and the background image is labeled as $I_{BG}$. The foreground object 208 is determined by applying a mask ($M_{FG}$) corresponding to the foreground object 208 to a two-dimensional foreground image ($I_{FG}$) that includes the foreground object 208, shown in FIG. 2A as $O_{FG}=I_{FG}+M_{FG}$.

In addition, FIG. 2A includes initial warp parameters 220a (also labeled as $p_0$). The initial warp parameters 220a can be based on default, commonly determined, or randomly selected homography transformations. In some embodiments, the initial warp parameters 220a include the initial location of the foreground object 208. Using the initial warp parameters 220a, the image composite system can warp 222a the foreground object 208 to obtain a warped foreground object 212a (also labeled as $O_{FG}(p_0)$). Further, in some embodiments, the image composite system composites 224 the warped foreground object 212a with the background image 206 to generate a first composite image 214a (also labeled as $I_{comp}(p_0)$). The compositing process can be expressed as shown in Equation 1 below.

$$I_{comp} = I_{FG} \odot M_{FG} + I_{BG} \odot (1 - M_{FG}) \quad (1)$$
$$= O_{FG} \oplus I_{BG}$$

In Equation 1, $\odot$ represents elemental multiplication and $\oplus$ represents compositing images. Thus, Equation 1 shows that the composite image ($I_{comp}$) equals the foreground image ($I_{FG}$) combined with the corresponding mask ($M_{FG}$), which equals the foreground object 208 described above (e.g., $I_{FG} \odot I_{FG} = O_{FG}$) composited to the background image 206 combined with an inverted mask ($I-M_{FG}$). Combining the inverted mask to the background image 206 makes the portion of the background image 206 where the foreground object 208 is being placed transparent such that no occlusions occur between when the foreground object 208 is composited to the background image 206.

Given the initial warp parameters 220a or $p_0$ that define the initial warp state of the foreground object 208, Equation 1 can be rewritten as Equation 2, shown below.

$$I_{comp}(p_0)=O_{FG} \oplus I_{BG} \quad (2)$$

In Equation 2, the composite image ($I_{comp}(p_0)$) is written as a function of the initial warp parameters ($p_0$). Similarly, FIG. 2A shows the first composite image 214a including the same constraints.

In one or more embodiments, the image composite system restricts geometric warp functions used to determine the warp parameters (e.g., the algorithms, weights, and parameters employed by a geometri prediction neural network) to planar or small perturbations. In these embodiments, the image composite system assumes that the perspective and orientation of foreground objects are relatively close to the perspective of the background image.

In FIG. 2A, the image composite system applies default and/or random warp parameters (e.g., the initial warp parameters 220a) to the foreground object 208 to obtain a warped foreground object 212a, which the image composite system composites with the background image 206 to obtain the initial/first composite image 214a. Often, the first composite image 214a will appear unrealistic because the initial warp parameters applied (e.g., $p_0$) are not tied to background image 206. Therefore, the image composite system employs a geometric prediction neural network to learn and determine more realistic warp parameters.

To illustrate, FIG. 2B shows the image composite system training a geometric prediction neural network to predict spatial transformations (i.e., warp parameters 220a-i). In one or more embodiments, the geometric prediction neural network 202 is a spatial transformer network (STN) that includes multiple geometric prediction generators (G) 202a-i, such as a first geometric prediction generator ($G_1$) 202a (or simply "first generator 202a"), a second geometric prediction generator ($G_2$) 202b (or simply "second generator 202b"), and an ith geometric prediction generator ($G_i$) 202i (or simply "ith generator 202i"), as shown in FIG. 2B. The generators 202a-i determine geometric updates to correct the inputted warp parameters to yield more realistic warp parameters.

As shown in FIG. 2B, the image composite system provides the foreground object 208 and the background image 206 to the geometric prediction neural network. In particular, the image composite system provides the warped foreground object 212a and the background image 206 to the first generator 202a. In the illustrated embodiment, the geometric prediction neural network 202 determines warp parameters based on both the foreground object 208 (or derivative warped versions) and the background image 206. Indeed, the geometric prediction neural network 202 employs the complex interaction between the foreground object 208 and the background image 206 to determine how to best spatially transform the foreground object 208 to fit the background scene. For instance, this complex interaction includes the geometry of the foreground object 208, the geometry and perspective of the background image 206, the relative camera position, and semantic understanding of realistic object layouts (e.g., how and where various types of objects can be placed in a scene).

As mentioned above, the image composite system trains the generators 202a-i of the geometric prediction neural network 202 to determine correcting updates to inputted warp parameters. To illustrate, based on providing the warped foreground object 212a and the background image 206 to the first generator 202a, the first generator 202a determines first warp parameter updates 226a that further transform the foreground object 208 from the initial warp parameters 220a to a more realistic looking object when composited with the background image 206. As shown, the image composite system combines the first warp parameters updates 226a to the initial warp parameters 220a at the first updater 228a to produce the second warp parameters 220b.

While applying the second warp parameters 220b will warp 222b the foreground object 208 to appear more realistic than the initial warp parameters 220a, the transformed foreground object will likely still appear unnatural if composited with the background image 206 after a single update. Stated differently, predicting large displacement or change warp parameters can be challenging. Accordingly, the image composite system employs iterative updates of the warp parameters, which makes smaller incremental improvements as well as consistently yields better results.

FIG. 2B shows that the geometric prediction neural network 202 also includes the second generator 202b to the ith generator 202i, each which further updates the warp parameters determined by the previous generator. To illustrate, based on providing the warped foreground object 212b and the background image 206 to the first generator 202a, the first generator 202b determines second warp parameter updates 226b that further transform the foreground object 208 from the second warp parameters 220b to a more realistic looking object when composited with the background image 206. As shown, the image composite system combines the second warp parameters updates 226b to the first or initial warp parameters 220a at the second updater 228b to produce the third warp parameters 220c.

Thus, at the ith iteration of the geometric prediction neural network 202 (e.g., the ith generator 202i), given the background image 206 and the foreground object 208 being transformed using the previous warp parameters (e.g., $p_{i-1}$), the ith generator 202i determines the ith warp parameter updates 226i such that the new warp parameters become the ith warp parameters 220i or $p_1$. This process is represented in Equation 3 below.

$$\Delta p_i = G_i(O_{FG}(p_i-1), I_{BG})$$

$$p_i = p_{i-1} \circ \Delta p_i \quad (3)$$

In Equation 3, $G_i(\cdot)$ is the geometric prediction generator and ∘ denotes composition warp parameters. Notably, as shown in FIG. 2B, because the original background image 206 and foreground object 208 are used in each iteration of the geometric prediction neural network 202, the image composite system preserves the original images from loss of information due to multiple warping operations.

As illustrated in FIG. 2B, upon the geometric prediction neural network 202 determining the last warp parameters (i.e., the ith warp parameters 220i), the image composite system warps 222i the foreground object 208 with the ith warp parameters 220i from the update 228i to create the ith warped foreground object $212_i$ and composites 224 the ith warped foreground object 212i with the background image 206 to generate the composite image 214i. In some embodiments, the image composite system presents the composite image 214i as an output.

As mentioned above, the image composite system can train the geometric prediction neural network using an adversarial discrimination neural network. For instance, the adversarial discrimination neural network receives the composite image generated by the geometric prediction neural network as input and provides feedback to the geometric prediction neural network regarding the realness of the composite image. Together, the geometric prediction neural network and the adversarial discrimination neural network form a generative adversarial network (GAN).

In additional embodiments, the generative adversarial network is a spatial transformer-generative adversarial network (ST-GAN), such as shown in FIG. 2C. Unlike conventional generative adversarial networks, the spatial transformer-generative adversarial network operates in low-dimensional warp space rather than high-dimensional pixel resolution space. Thus, the geometric prediction neural network predicts warp parameters that are resolution agnostic as opposed to predicting pixels for high-resolution images, which is computationally intensive and expensive.

To illustrate, and as mentioned above, FIG. 2C illustrates using an adversarial discrimination neural network 204 to train the geometric prediction neural network 202. FIG. 2C includes the components of the system shown in FIG. 2B albeit with the second generator 202b and associated second warp parameter updates 226b, the second updater 228b, and third warp parameters 220c replaced by generator 202i-1 and associated parameter updates 226i-1, updater 228i-1, and warp parameters 220*i*–1 to illustrate that there can be any number of generator and iterations. Furthermore, FIG. 2C shows that the adversarial discrimination neural network 204 includes a discriminator (D). For ease of explanation, a first discriminator 204*a* and a second discriminator 204*b* are shown as the same discriminator (D) at two different stages of training. Using the adversarial discrimination neural network 204, the image composite system can gradually train the geometric prediction neural network 202 to iteratively improve predictions of warp parameters.

Notably, while new generators are added at each iteration of training (e.g., the image composite system adds and trains each subsequent new generator by fixing the weights of all previous generators $\{G_i\}_{j=1\ldots i-1}$), the discriminator (D) remains the same and is continually improved during the sequential learning process. Indeed, in many embodiments, the image composite system employs the same discriminator (D) for all stages of the generator ($G_i$), as the fundamental measure of "geometric fakeness" does not change over iterations. In addition, while the image composite system employs the same discriminator (D), the image composite system still trains the discriminator (D) to better learn to discern composite images from natural or real images. In this manner, the image composite system quickly and robustly trains the overall generative adversarial network in an end-to-end manner.

As illustrated in FIG. 2C, the image composite system, in one or more embodiments, trains the ith generator $G_i$ 202*i* and the first discriminator 204*a* by using feedback 230*i*–1 from the first discriminator 204*a* in addition to the real training images, as described above in connection with FIG. 1. For instance, the image composite system provides the i–1th composite image 214*i*–1 to the first discriminator 204*a*, which determines whether the image is a real image. As shown, the first discriminator 204*a* provides the feedback 230*i*–1 to the ith generator $G_i$ 202*i* (for simplicity, FIG. 2C does not show the full feedback line between the first discriminator 204*a* and the ith generator $G_i$ 202*i*).

As a note, FIG. 2C shows the first discriminator 204*a* receiving the i–1th composite image 214*i*–1 and providing feedback 230*i*–1 to the ith generator $G_i$ 202*i*. Other configurations can include the first discriminator 204*a* receiving the first composite image from the first generator $G_1$ 202*a* and providing feedback to a second generator (e.g., $G_2$). In alternative embodiments, the first discriminator 204*a* receives a composite image from any generator within the geometric prediction neural network 202 and provides feedback to a subsequent generator for training purposes. Additionally, one will appreciate that, while not illustrated for simplicity, the discriminator (D) can provide feedback to multiple generators sequentially and iteratively.

As mentioned above, the first discriminator 204*a* provides feedback 230*i*–1 to the ith generator $G_i$ 202*i*. If the feedback 230*i*–1 indicates that the first discriminator 204*a* classified the i–1th composite image 214*i*–1 as a non-realistic image, the image composite system trains the ith generator $G_i$ 202*i* to determine more realistic warp parameters. If the feedback 230*i*–1 indicates that the first discriminator 204*a* classified the i–1th composite image 214*i*–1 as real, the image composite system can indicate to the ith generator $G_i$ 202*i* (e.g., the geometric prediction neural network 202) that it fooled the discriminator (D) (e.g., the first discriminator 204*a*). In one or more embodiments, the image composite system employs back propagation to provide this feedback.

Further, in some cases, when the geometric prediction neural network 202 fools the discriminator (D) of the adversarial discrimination neural network 204 one or more times, the image composite system can conclude training. For example, the second feedback 230*i* indicates that the second discriminator 204*b* again was fooled by the ith composite image 214*i*. As such, the image composite system can suspend or stop training of the geometric prediction neural network 202.

In addition, the image composite system can provide additional feedback 232*i*–1 to the second discriminator 204*b* to further train the discriminator (D). The additional feedback 232*i*–1 can include the same data as the feedback 230*i*–1 described above and/or that the i–1th composite image 214*i*–1 was a composite image. For example, if the first discriminator 204*a* determines that the i–1th composite image 214*i*–1 is fake, the image composite system uses the additional feedback 232*i*–1 to indicate a successful classification to the discriminator (D) (e.g., adversarial discrimination neural network 204). Alternatively, if the first discriminator 204*a* determines that the i–1th composite image 214*i*–1 is real, the image composite system uses the additional feedback 232*i*–1 to train the second discriminator 204*b* to better classify composite images.

In various embodiments, the image composite system iteratively trains the geometric prediction neural network 202 and the adversarial discrimination neural network 204 until one or both neural networks converge. In some cases, the networks converge when any additional change would increase the error loss rather than reduce or maintain the error loss. For instance, the error loss to the geometric prediction neural network 202 decreases as the determined warp parameters better mimic natural transformations. For the adversarial discrimination neural network 204, error loss decreases as it continues to correctly classify images. Because the geometric prediction neural network 202 and the adversarial discrimination neural network compete against each other, a decrease in error loss to one neural network often results in an increase of error loss to the other neural network. In some embodiments, the image composite system prioritizes error loss of the geometric prediction neural network 202 over the error loss of the adversarial discrimination neural network 204.

More specifically, in one or more embodiments, the image composite system optimizes the generative adversarial network at the ith iteration using the following minimax function shown in Equation 4 below.

$$\min_{G_i} \min_{\mathcal{D} \in \mathbb{D}} \mathbb{E}_{\substack{x \sim \mathbb{P}_{fake} \\ p_i \sim \mathbb{P}_{p_i|p_{i-1}}}} [\mathcal{D}(x(p_i))] - \mathbb{E}_{y \sim \mathbb{P}_{real}} [\mathcal{D}(y)] \quad (4)$$

In Equation 4, $y=I_{real}$ and $x=I_{comp}$ can be drawn from the real data and synthetic (e.g., fake) composite distributions. In one or more embodiments, $\mathbb{D}$ is the set of 1-Lipschitz functions enforced by adding a gradient penalty term. Further, in some embodiments, $p_i$ (where $G_i$ is implied, defined in Equation 3) is drawn from the posterior distribution conditioned on $p_{i-1}$, where recursion is implied. In Equation 4, at the first iteration (e.g., i=1), the initial warp parameters $p_0$ can be drawn from $\mathbb{P}_{pert}$, a predefined distribution for geometric data augmentation. Alternatively, $p_0$ can be randomly assigned in the initial iterations, as described above.

In some embodiments, the image composite system constrains the warp parameters to reside within a trust region of the background image by employing penalties within an objective function of the geometric prediction neural network. For instance, the image composite system constrains the warp parameter updates (e.g., $\Delta p_i$) to lie within a trust region by introducing the additional penalty $\mathcal{L}_{update}=\|\Delta p_i\|_2^2$. By enforcing this additional penalty, the image composite system prevents the generative adversarial network from learning trivial solutions that transform the foreground object to outside of the background image or shrinking the foreground object into nothing.

As mentioned above, the image composite system can train the geometric prediction neural network 202 and the adversarial discrimination neural network 204 sequentially. For instance, in one or more embodiments, the image composite system alternately updates the discriminator (D) and generators ($G_i$) during training. In particular, the image composite system alternates the respective loss functions shown in Equations 5 and 6.

$$\mathcal{L}_D = \mathbb{E}_{x,p_i}[\mathcal{D}(x(p_i))] - \mathbb{E}_y[\mathcal{D}(y)] + \lambda_{gradient} \cdot \mathcal{L}_{gradient} \quad (5)$$

$$\mathcal{L}_{G_i} = -\mathbb{E}_{x,p_i}[\mathcal{D}(x(p_i))] + \lambda_{update} \cdot \mathcal{L}_{update} \quad (6)$$

In Equations 5 and 6, $\lambda_{gradient}$ and $\lambda_{update}$ are penalty weights for the discriminator (D) gradient and the warp parameter updates ($\Delta p_i$), respectively. Notably, in Equations 5 and 6, the generators ($G_i$) and the warp parameter updates ($\Delta p_i$) are again implied through Equation 3. In addition, the image composite system can fine-tune the generative adversarial network with N learned updates end-to-end. In this manner, the generator objective is the sum of each training iteration to the generators ($G_i$), as shown in Equation 7 below.

$$\mathcal{L}_G = \Sigma_{i=1}^N \mathcal{L}_{G_i} \quad (7)$$

Overall, the image composite system trains the generative adversarial network to determine warp parameters that enable foreground objects to be composited into background images realistically and naturally. Upon training the generative adversarial network that includes the geometric prediction neural network 202 and the adversarial discrimination neural network 204, the image composite system can then use the generative adversarial network to generate composited images, as described below in connection with FIG. 3.

Figure 3:
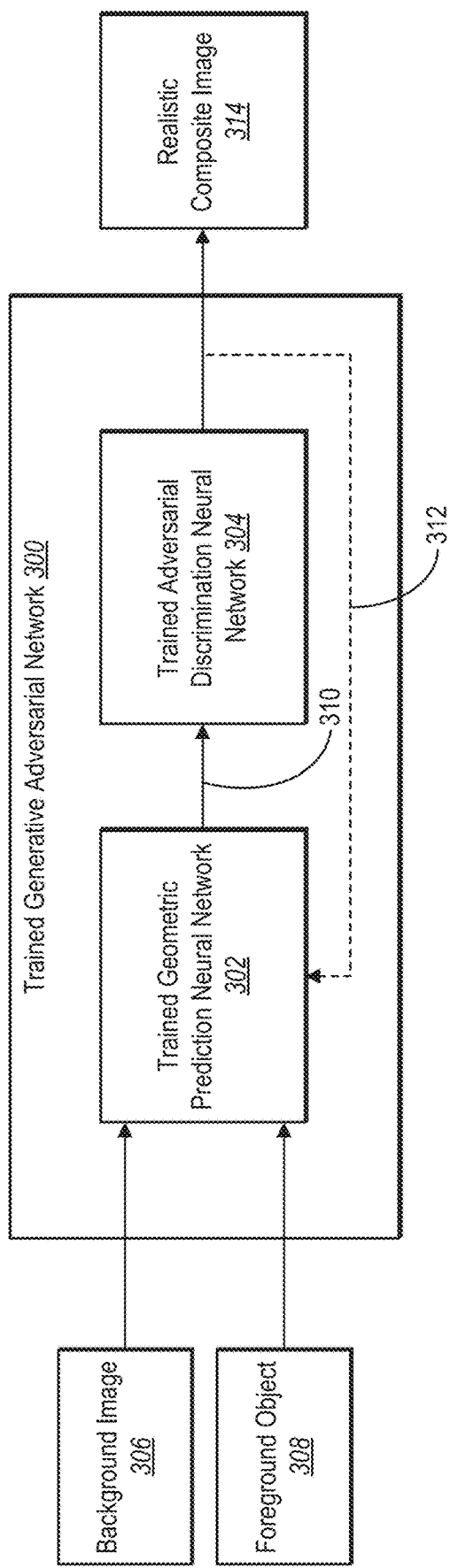
FIG. 3 illustrates a diagram of employing a trained generative adversarial network that generates realistic composite images in accordance with one or more embodiments.

To illustrate, FIG. 3 shows a diagram of employing a trained generative adversarial network 300 that generates realistic composite images in accordance with one or more embodiments. As shown, the trained generative adversarial network 300 includes a trained geometric prediction neural network 302 and a trained adversarial discrimination neural network 304. In some embodiments, the trained generative adversarial network 300 is a trained spatial transformer-generative adversarial network.

In one or more embodiments, the image composite system receives user input that includes a background image 306 and a foreground object 308 (e.g., a foreground object image). For example, the image composite system receives a copy of the background image 306 and/or the foreground object 308 within an application (e.g., a desktop or mobile application). As described above, the image composite system can create a corresponding object mask for the foreground object 308 to isolate the foreground object 308 from a foreground image in which the foreground object 308 resides. In addition, the image composite system provides the background image 306 and the foreground object 308 to the trained generative adversarial network 300.

Using the learned weights and trained algorithms, the trained geometric prediction neural network 302 determines warp parameters for the foreground object 308 (e.g., a foreground object image) based on the geometric perspective of the background image 306. The trained geometric prediction neural network 302 can produce one of many sets of warp parameters that spatially transform the foreground object 308 and the foreground object 308 to naturally appear in various locations of the background image 306 (e.g., a multi-modal solution).

In addition to determining warp parameters for the foreground object 308 with respect to the background image 306, the trained geometric prediction neural network 302 can also apply the warp parameters to the foreground object 308 and composite the warped foreground object with the background image 306 to generate a composite image 310. In one or more embodiments, the image composite system provides the composite image 310 directly as an output, bypassing the trained adversarial discrimination neural network 304.

In alternative embodiments, the image composite system feeds the composite image 310 to the trained adversarial discrimination neural network 304 to perform an additional verification step that the image is indeed realistic. As described previously, the trained adversarial discrimination neural network 304 classifies input images as real or fake (i.e., non-realistic). Accordingly, the trained adversarial discrimination neural network 304 can indicate whether the composite image 310 generated by the trained geometric prediction neural network 302 is realistic. If the image is realistic, the image composite system can provide the realistic image 314 as an output.

Alternatively, the image composite system can provide a negative indication 312 to the trained geometric prediction neural network 302 that the composite image 310 is not realistic. In this case, the trained geometric prediction neural network 302 predicts updated warp parameters for the foreground object 308, generates an updated composite image using the updated warp parameters, and again provides the updated composite image to the trained geometric prediction neural network 302. The image composite system can repeat this process until the updated composite image appears realistic.

In many embodiments, and as just described, the image composite system uses an adversarial discrimination neural network to train the geometric prediction neural network. In alternative embodiments, the image composite system trains the geometric prediction neural network using supervised learning. For instance, the image composite system employs supervisory learning in place of the adversarial discrimination neural network. Alternatively, in some cases, the image composite system employs supervisory learning in addition to adversarial discrimination neural network. Supervisory training is described below in connection with FIGS. 4 and 5.

Figure 4:
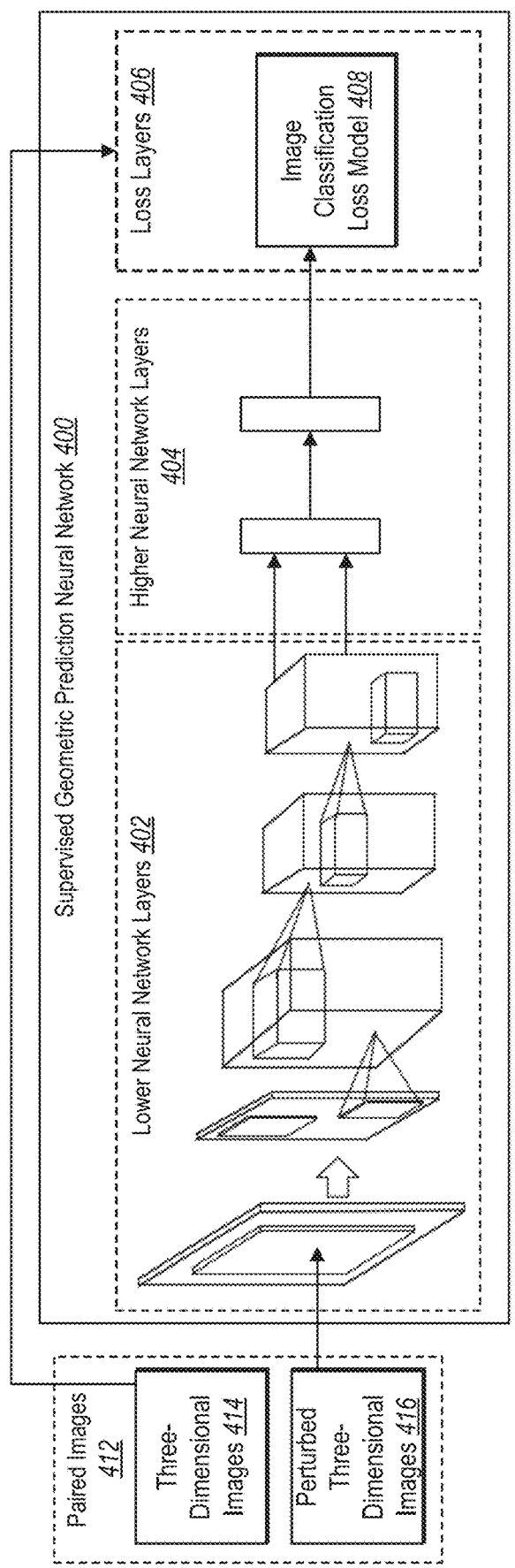
FIG. 4 illustrates a diagram of training a supervised geometric prediction neural network in accordance with one or more embodiments.

To illustrate employing supervisory learning, FIG. 4 shows a diagram of training a supervised geometric prediction neural network 400 in accordance with one or more embodiments. The supervised geometric prediction neural network 400, in various embodiments, is a convolutional neural network. For example, as illustrated, the supervised geometric prediction neural network 400 includes lower neural network layers 402, higher neural network layers 404, and loss layers 406 that includes an image classification loss model 408.

To train the supervised geometric prediction neural network 400, the image composite system can employ paired images 412 that include three-dimensional images 414 and corresponding perturbed three-dimensional images 416. Specifically, the three-dimensional images 414 include scenes of backgrounds with one or more foreground objects included in the scene. In addition, the perturbed three-dimensional images 416 include corresponding scenes with one of the foreground objects in each scene perturbed or the perspective (e.g., camera perspective) of the scene slightly perturbed. Together, an image from the three-dimensional images 414 and a corresponding perturbed image from the perturbed three-dimensional images 416 form a training pair. Further, the paired images 412 can include real and synthetically created images.

In some embodiments, the image composite system obtains the three-dimensional images 414 and the corresponding perturbed three-dimensional images 416 from an image repository. In alternative embodiments, the image composite system generates the paired images 412. Generating paired images is described below with respect to FIG. 5.

To train the supervised geometric prediction neural network 400, the image composite system provides the perturbed three-dimensional images 416 (or two-dimensional conversions of the three-dimensional images 416) to the lower neural network layers 402 of the supervised geometric prediction neural network 400. In particular, the image composite system separately provides the background scene (i.e., background image) and the perturbed foreground object to the lower neural network layers 402. In some embodiments, the lower neural network layers 402 learns and provides maps that numerically represent the background scene and the perturbed foreground object. In addition, the higher neural network layers 404 can use the maps to learn and determine/predict warp parameters for the perturbed object given the background scene. For instance, the higher neural network layers 404 learn how to warp the perturbed foreground object (e.g., warp the perturbed foreground object images) to naturally fit within the background scene, then generated corresponding warp parameters.

Additionally, the image composite system can employ the loss layers 406 to further train the supervised geometric prediction neural network 400. For instance, in one or more embodiments, the image composite system feeds the three-dimensional (or two-dimensional) image from the image pair to the image classification loss model 408 to compare the warped foreground object to the original foreground object. In particular, the foreground object in the three-dimensional image provides a ground truth of how the foreground object naturally fits within the background scene. Accordingly, the ground truth can indicate ideal warp parameters (i.e., ground truth warp parameters) for the foreground object.

To further illustrate, by comparing the generated warp parameters for the perturbed foreground object to the ground truth parameters for the same object given the same background scene, the image classification loss model 408 can identify an amount of error loss for the generated warp parameters (e.g., using mean square error or other types of mathematical comparisons). For instance, the image classification loss model 408 can provide the amount of error loss back to the lower neural network layers 402 and the higher neural network layers 404 to further train the supervised geometric prediction neural network 400 to learn more accurate warp parameters for perturbed foreground objects (e.g., produce less error loss). The process of providing error loss via back propagation to the supervised geometric prediction neural network 400 can continue until the supervised geometric prediction neural network 400 converges.

Once trained, the image composite system can employ the supervised geometric prediction neural network 400 to generate composite images, as described above. For example, the image composite system employs the lower neural network layers 402 and the higher neural network layers 404 to determine warp parameters for an inputted foreground object and background image. Notably, the image composite system does not need to employ the loss layers 406 once the supervised geometric prediction neural network 400 is trained.

Figure 5:
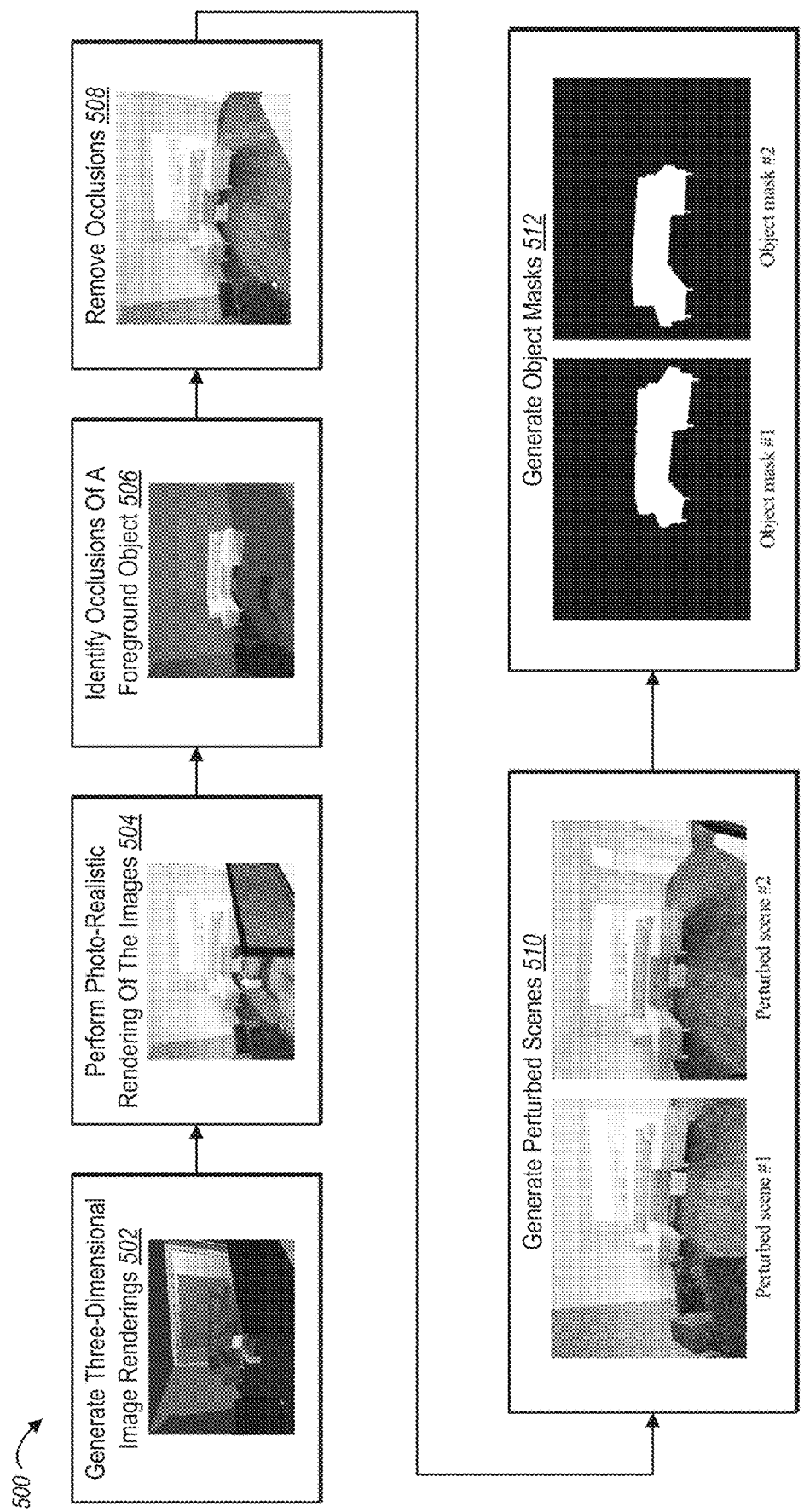
FIG. 5 illustrates a diagram of an image generation pipeline in accordance with one or more embodiments.

As mentioned above, in some embodiments, the image composite system can generate a set of three-dimensional images, including pairs of perturbed images. To illustrate, FIG. 5 shows a diagram of a training image generation pipeline 500 in accordance with one or more embodiments. As shown, FIG. 5 includes the image composite system generating 502 three-dimensional image renderings. For instance, as shown, the three-dimensional renderings are indoor scenes that include one or more three-dimensional foreground objects. In some embodiments, the image composite system renders the images from a dataset, such as the SUNCG dataset by Song et al., which is a large collection of three-dimensional house layouts with indoor furniture and other objects. As explained earlier, the image composite system can convert the three-dimensional image renderings into two-dimensional image renderings to determine appropriate warp parameters for foreground objects.

In various embodiments, the image composite system can optionally perform 504 photo-realistic rendering to the images. For instance, the image composite system applies colors and patterns to the background scene and objects to cause the images to appear more realistic. In some embodiments, the image composite system employs a physically-based rendering system or program (e.g., Mitsuba by Wenzel Jakob (http://mitsuba-renderer.org)) to achieve photo-realistic rendering.

In addition, as shown, the image composite system can identify 506 a foreground object within the image. In some embodiments, the image composite system selects a random foreground object in the image. In alternative embodiments, the image composite system selects the biggest foreground object. In various embodiments, the image composite system selects the object nearest the center of the image. In still other embodiments, the image composite system selects a foreground object based on a combination of the above and other factors.

Upon selecting a foreground object, the image composite system can create an object mask for the object. As described above, the mask isolates the foreground object within a foreground image. Indeed, as mentioned above, a foreground object can refer to a foreground image that includes the foreground object plus an object mask for the foreground object.

Further, upon selecting a foreground object, the image composite system removes 508 occlusions within the image, as shown. For instance, in one or more embodiments, upon selecting a foreground object, the image composite system detects that other objects overlap or block the selected foreground object. In some embodiments, the image composite system compares the masks of other objects to detect if they overlap with the mask of the selected object. Upon detecting an overlapping or occluding object with the selected foreground object, the image composite system can remove the occluding objects. As shown in FIG. 5, the image composite system removes a television-like object from the bottom right of the image which partially overlaps the couch (e.g., the selected object).

As shown, the image composite system also generates 510 perturbed scenes of the image. For instance, the image composite system changes the perspective of the image, which changes the positioning of the foreground object within the scene (e.g., camera perturbation). In alternative embodiments, the image composite system applies perturbations by rotating, skewing, or otherwise perturbing the spatial orientation of the selected foreground object, as described above. The image composite system can generate one or more perturbations for each image, as shown.

Also, as shown, the image composite system generates 512 object masks from the foreground object based on the perturbed scenes. In this manner, the image composite system creates perturbed foreground objects that can be employed to train a geometric prediction neural network, as described above. For instance, the image composite system uses the image pair that includes the original foreground object and one or more perturbed foreground objects corresponding to a scene to train a geometric prediction neural network (e.g., supervised or unsupervised).

Figure 6B:
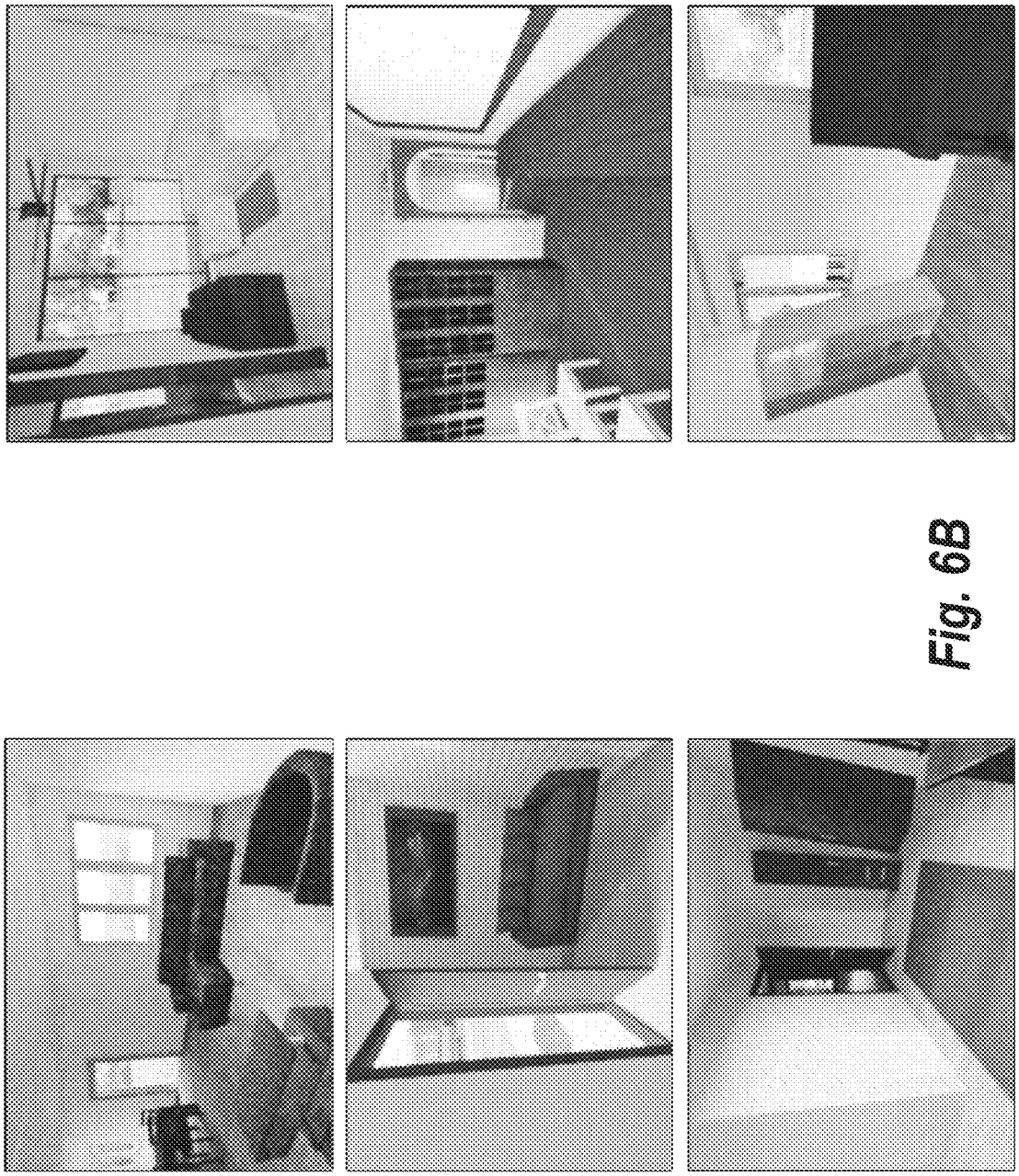

Turning now to FIGS. 6A-6E, example images (e.g., two-dimensional images) of perturbed, warped, and ground truth composite images along with corresponding residuals will be provided. In particular, FIG. 6A illustrates ground truth composite images 602. FIG. 6B illustrates corresponding perturbed composite images 604. FIG. 6C illustrates corresponding warped composite images 606. FIG. 6D illustrates perturbed residual images 608 showing residual (e.g., differences) between the ground truth composite images 602 and the perturbed composite images 604. FIG. 6E illustrates the warped residual images 610 showing residual between the ground truth composite image 602 and the warped composite images 606.

More particularly, FIG. 6A illustrates ground truth composite images 602 of indoor scenes with furniture as the foreground objects. As described above, the image composite system can generate and render various three-dimensional scenes with multiple foreground objects. Each of the foreground objects in the ground truth composite images 602 include ground truth warp parameters for the object.

Further, the image composite system can select one of the foreground objects within each image to perturb. As mentioned above, FIG. 6B illustrates corresponding perturbed composite images 604 with one of the foreground objects perturbed. For simplicity, the image composite system selects the largest, center foreground object to perturb, such as a couch or cabinet. As shown, the perturbed objects appear out of place within their corresponding background image. A visual comparison of each selected foreground object before and after perturbation is shown in FIG. 6D, described below.

Based on the perturbed foreground object, the image composite system can determine warp parameters to better align the perturbed foreground object with the corresponding background image. For example, the image composite system employees the techniques and principles described above with respect to the generative adversarial network and/or geometric prediction neural network to determine warp parameters that more realistically align the perturbed foreground object with the corresponding background image. As shown in FIG. 6C, the warped objects in the warped composite images 606 appear naturally placed within their corresponding background image. A visual comparison of each selected foreground object before and after applying warp parameters is shown in FIGS. 6D and 6E, described below.

As mentioned above, FIG. 6D illustrates perturbed residual images 608 showing residual (e.g., differences) between the ground truth composite images 602 and the perturbed composite images 604. Also, FIG. 6E illustrates the warped residual images 610 showing residual between the ground truth composite image 602 and the warped composite images 606. In each of the residual images, the residual (i.e., the black shadows around the foreground objects) shows the misalignment with the ground truth parameters of each foreground object. Notably, the residual from the warped residual images 610 is reduced compared to the residual from the perturbed residual images 608. Indeed, the smaller residual from the warped residual images 610 indicates that the warped residual images 610 provide beneficial and accurate spatial transformations. Further, in most instances, the image composite system warps the perturbed foreground objects almost back to the ground truth geometric alignment.

FIG. 7 illustrates example results of the generative adversarial network iteratively learning and applying warp parameters that are used in a composite image in accordance with one or more embodiments. As shown, FIG. 7 includes an initial composite image 702 and four updated composite images 704a-d. In the initial composite image 702, the foreground object 706 (i.e., the tall narrow bookshelf) is placed near the center of the room, away from the back wall.

As mentioned above, the image composite system can iteratively train the geometric prediction neural network and/or generative adversarial network to improve determinations of warp parameters for a foreground object given a background image. As shown in FIG. 7, each iteration in the updated composite images 704a-d shows the foreground object progressively moving back and spatially transforming to appear against the back wall in alignment with the adjacent bookshelf. Indeed, in each iteration of the composite image, the geometric prediction neural network determines warp parameters that resulted in a more natural and realistic look and placement of the foreground object within the background image.

Figure 8A:
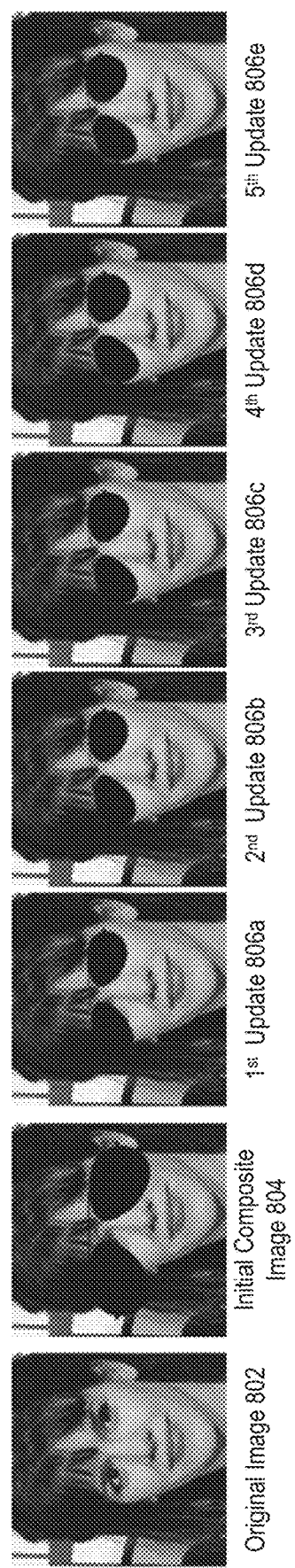

In FIGS. 8A and 8B, example image results of a generative adversarial network training using actual images is illustrated. For example, FIG. 8A illustrates an iterative process of adding sunglasses to an actual image of a woman's face. FIG. 8B illustrates sample results of adding glasses to various faces.

The results in FIGS. 8A and 8B correspond to a generative adversarial network having a geometric prediction neural network that was trained using an adversarial discrimination neural network. In particular, the adversarial discrimination neural network was fed real images of different faces with glasses and without glasses (e.g., but not paired images of the same faces with and without glasses) to learn how to classify images of faces with glasses. Notably, the glasses represent foreground objects that are from two-dimensional foreground object images (e.g., images that can be downloaded from the Internet) rather than generated from three-dimensional renderings. The image composite system then employed the adversarial discrimination neural network to train the geometric prediction neural network to generate composite images of faces with glasses that fooled the adversarial discrimination neural network.

To illustrate, FIG. 8A shows an original image 802 of a face, an initial composite image 804, and five updated composite images 806a-e. As shown in the initial composite image 804, the glasses are placed in the center of the image without regard to the position, size, or orientation of the face. In each case, the image composite system placed a pair of handcrafted glasses into the center of an image of a face in an initial composite image. No other notation or annotations about where or how the faces are placed was provided to the generative adversarial network.

As shown in FIG. 8A, the image composite system trains the geometric prediction neural network using the adversarial discrimination neural network to learn to determine improved updated warp parameters. Indeed, as shown in the five updated composite images 806a-e, with each iteration, the warp parameters determined by the geometric prediction neural network better locate the glasses (i.e., foreground object) with respect to the face (i.e., background image) as well as improve the spatial transformation (e.g., apply skew, in-plane rotation, and alignment) of the glasses with respect to the face.

Results between initial composite images and five iterations of updated warp parameters are shown in FIG. 8B. In particular, each pair of images in FIG. 8B includes an initial composite image 814 and an updated composite image 816. The updated composite images 816 appear as if the glasses were naturally included in the original image. Thus, as shown in FIGS. 8A and 8B, the generative adversarial network improves adding a foreground object to realistic images, even when the generative adversarial network is trained in an unsupervised manner. Further, the generative adversarial network is employable across a variety of domains that benefit from generating composite images.

Figure 9:
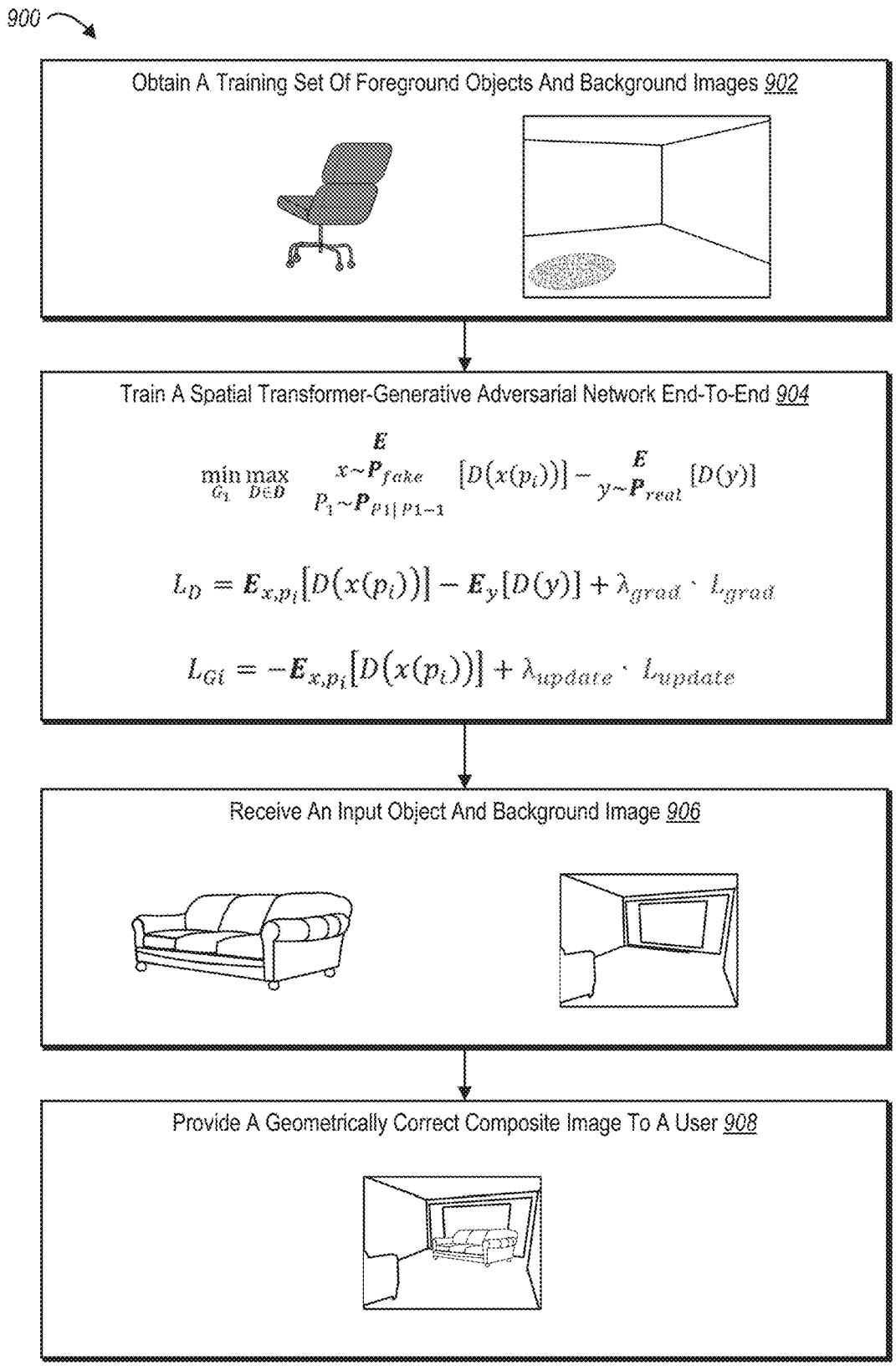
FIG. 9 illustrates acts in performing a step for training and employing a generative adversarial network in accordance with one or more embodiments.

FIG. 9 illustrates a series of acts 900 in performing a step for training and employing a generative adversarial network in accordance with one or more embodiments. In various embodiments, the image composite system described herein performs the series of acts 900. In some embodiments, the image composite system is located on a server device and performs one or more of the series of acts 900 in connection with a client device. In alternative embodiments, the image composite system is located directly on a client device, such as within a digital medium environment for creating compositing images.

As shown, the series of acts 900 includes the image composite system obtaining 902 a training set of foreground objects and background images. As explained earlier, a foreground object can include a foreground image and a corresponding mask that isolates the foreground object from other portions of the foreground image. The foreground objects and/or background images can be synthetically generated or acquired from real images. In addition, the training set can include paired or unpaired images.

In some embodiments, the image composite system generates the training set, as described above with respect to FIG. 5. In alternative embodiments, the image composite system obtains the foreground objects and/or background images from an image repository or three-dimensional object database. In some cases, the image composite system also obtains real images as part of the training set. For example, the image composite system identifies a set of images that includes foreground objects naturally placed within background images.

In addition, as shown, the series of acts 900 includes the image composite system training 904 a spatial transformer-generative adversarial network end-to-end. As explained above, the spatial transformer-generative adversarial network includes a geometric prediction neural network and an adversarial discrimination neural network. In addition, as previously described, in various embodiments, the geometric prediction neural network is a spatial transformer neural network that determines warp parameters for foreground objects based on background images.

Using the foreground objects, corresponding object masks, the warp parameters, and the background images, the image composite system can generate a geometric prediction neural network used to generate composite images. As described previously, and as shown in Equations 1 and 2 above, the image composite system uses the warp parameters determined by the geometric prediction neural network to generate composite images.

Additionally, in various embodiments, the image composite system trains the geometric prediction neural network using iterative geometric corrections. For example, Equation 3 above provides further detail regarding iteratively updating warp parameters by the geometric prediction neural network.

In order for the geometric prediction neural network to learn geometric warps that map composite images closer to the natural image manifold (e.g., the intersection between geometric and natural images) by reducing geometric discrepancies, the image composite system integrates the geometric prediction neural network into a generative adversarial network framework. As described above, the image composite system employs an adversarial discrimination neural network to further train the geometric prediction neural network.

In one or more embodiments, the image composite system trains the adversarial discrimination neural network using real images. In this manner, the adversarial discrimination neural network can classify composite images from the geometric prediction neural network as appearing realistic or non-realistic. Using feedback and back propagation from the realism classification of the adversarial discrimination neural network, the image composite system can further train both the geometric prediction neural network and the adversarial discrimination neural network until the generative adversarial network converges.

More particularly, the image composite system employs the minimax objective function shown in Equation 4 above to optimize the generative adversarial network. For example, the image composite system employs the loss functions shown in Equations 5 and 6 above to sequentially train the geometric prediction neural network and the adversarial discrimination neural network in an end-to-end manner, until overall loss is minimized.

As shown in FIG. 9, the series of acts 900 includes receiving 906 an input object and a background image. For example, a user provides a foreground object and a background image to the image composite system. In some instances, the background image is a real image, such as an image captured by a client device (e.g., a digital camera on the client device) associated with the user. Likewise, the foreground object can be an image of a captured foreground object.

Using the trained generative adversarial network, the image composite system can determine warp parameters for the foreground object such that it appears naturally placed within the background image when composited with the background image. As detailed above, the image composite system can employ the geometric prediction neural network, and in some cases, the adversarial discrimination neural network to generate a composite image that includes the foreground object to appear naturally placed within the background image.

In addition, as shown in FIG. 9, the series of acts 900 includes the image composite system providing 908 the geometrically correct composite image to a user (e.g., as an output). For instance, as explained earlier, the image composite system warps the foreground object with respect to the background image using the trained geometric prediction neural network to spatially transform the foreground object to align and naturally fit into the perspective of the background image. Then, upon generating the composite image, the image composite system provides the composite image to the user. In some embodiments, the image composite system provides the composite image to the user within an application or program, such as within a web browser or an image editing application.

As mentioned above, the image composite system provides the benefit of operating in low-dimensional warp parameter space rather than in high-dimensional pixel space. As such, the image composite system requires less memory and computational resources than conventional systems. To illustrate, FIG. 10 shows a diagram of employing low-dimensional warp space to determine warp parameters and applying the warp parameters to a high-resolution image in accordance with one or more embodiments.

Figure 10:
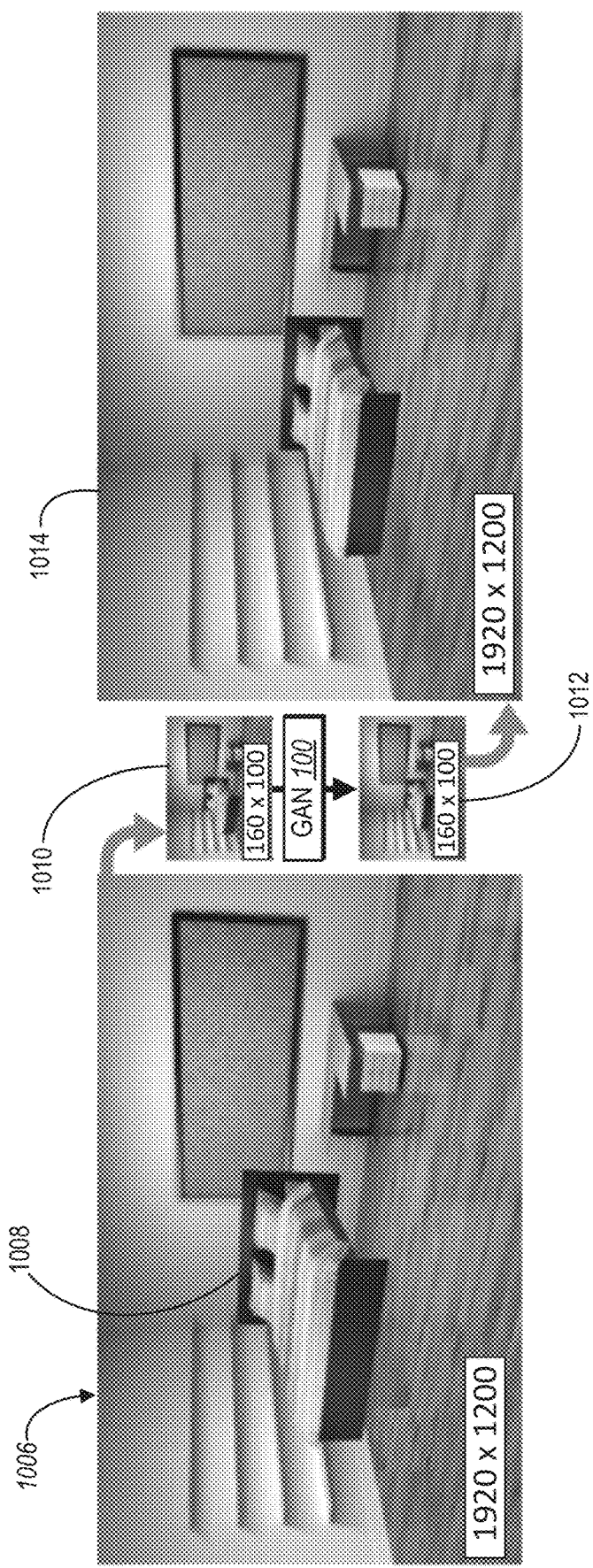
FIG. 10 illustrates a diagram of employing low-dimensional warp space to determine warp parameters and applying the warp parameters to a high-resolution image in accordance with one or more embodiments.

As shown in FIG. 10, a background image 1006 (e.g., a bedroom) and a foreground object 1008 (e.g., a bed) is provided to the image composite system. While shown together, in one or more embodiments, the background image 1006 and the foreground object 1008 (e.g., foreground object image) are provided separately. As also shown, the background image 1006 and the foreground object 1008 are provided at a high resolution (e.g., 1920× 1200 pixels).

Upon receiving the background image 1006 and the foreground object 1008, the image composite system can scale down the inputs (e.g., the scaled-down background image 1010). For example, as shown, the image composite system reduces the resolution of the images to 160×100 pixels. While not drawn to exact scale, FIG. 10 illustrates a rough size comparison between the size foreground object the original background image 1006 and the scaled-down background image 1010.

Once the inputs are scaled down, the image composite system can provide the scaled-down inputs to the generative adversarial network 100. As described above, the generative adversarial network 100 determines warp parameters that naturally place the foreground object within the background image. For instance, FIG. 10 shows a reduced-sized composite image 1012 where the foreground object (e.g., bed) has been warped to more naturally fit within the background image.

The image composite system can transfer the same warp parameters determined for the reduced sized foreground object to the original high-resolution foreground object and background image without loss of quality or granularity. For instance, as shown in FIG. 10, the image composite system applies the same warp parameters to the full resolution foreground object 1008 and background image 1006 to obtain the full resolution composite image 1014.

Indeed, the image composite system can scale the warp parameters regardless of resolution, and warp parameters predicted from the low-resolution inputs are transferable to high-resolution images. Thus, unlike conventional systems which are dependent on predicting pixels at high resolutions, the image composite system is resolution agnostic. Accordingly, the image composite system described herein enables operates in low-dimensional warp space employing simpler calculations, which requires significantly less memory and processing resources, without adversely affecting the quality of composite images.

Figure 11:
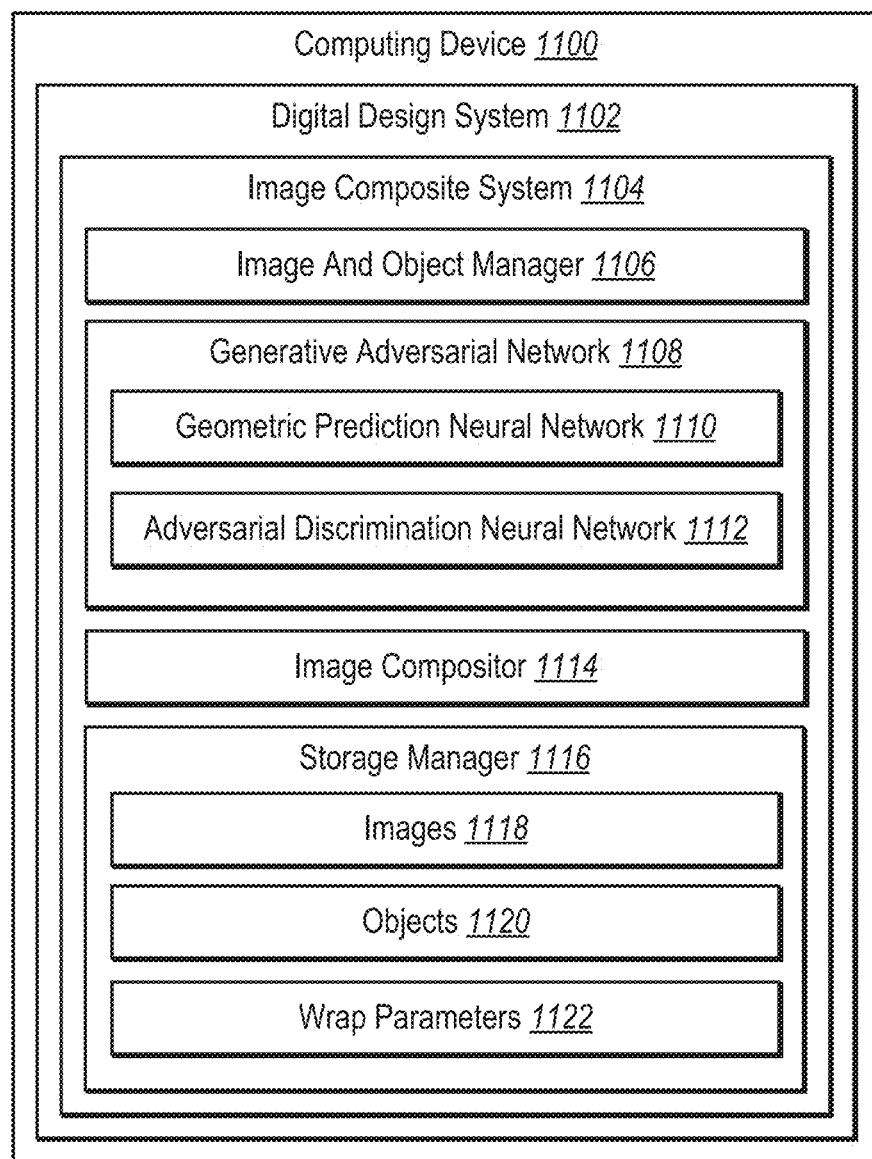
FIG. 11 illustrates a schematic diagram of an image composite system in accordance with one or more embodiments.

Referring now to FIG. 11, additional detail will be provided regarding capabilities and components of the image composite system in accordance with one or more embodiments. In particular, FIG. 11 shows a schematic diagram of an example architecture of the image composite system 1104 located within a digital design system 1102 and implemented on a computing device 1100. The image composite system 1104 can represent one or more embodiments of the image composite system described previously.

As shown, the image composite system 1104 is located on a computing device 1100 within a digital design system 1102. In general, the computing device 1100 may represent various types of client devices. For example, in some embodiments, the client is a mobile device, such as a laptop, a tablet, a mobile telephone, a smartphone, etc. In other embodiments, the computing device 1100 is a non-mobile device, such as a desktop or server, or another type of client device. Additional details with regard to the computing device 1100 are discussed below as well as with respect to FIG. 17.

The digital design system 1102, in general, facilitates the creation, modification, sharing, and/or deletion of digital images within electronic documents and/or system applications. For example, the digital design system 1102 provides a variety of tools on the computing device 1100 related to image creating and editing (e.g., photo-editing). In addition, the digital design system 1102 can access additional locally or remotely stored repositories of images and/or objects (e.g., three-dimensional objects) to be inserted into composite images. Further, in some embodiments, the digital design system 1102 can be located separately from the computing device 1100 and communicate with the image composite system 1104.

Moreover, the digital design system 1102 can operate in connection with one or more applications to generated composite images on the computing device 1100. For example, in one or more embodiments, the digital design system 1102 operates in connection with digital design applications such as ADOBE® PHOTOSHOP®, ADOBE® ILLUSTRATOR®, ADOBE® INDESIGN®, or other digital design applications.

As illustrated in FIG. 11, the image composite system 1104 includes various components. For example, the image composite system 1104 includes an image and object manager 1106, a generative adversarial network 1108, an image compositor 1114, and a storage manager 1116. As shown, the generative adversarial network 1108 includes a geometric prediction neural network 1110 and an adversarial discrimination neural network 1112. Additionally, the storage manager includes images 1118, objects 1120, and warp parameters 1122.

As mentioned above, the image composite system 1104 includes the image and object manager 1106. In general, the image and object manager 1106 facilitates accessing, obtaining, generating, importing, exporting, modifying, and removing images 1118. Images 1118 can include foreground images (which include foreground objects) and background images. For instance, the image and object manager 1106 manages training images, such as paired and unpaired images, perturbed images, and/or real images. As shown, one or more of the images 1118 are stored by the storage manager 1116.

In addition, the image and object manager 1106 facilitates accessing, obtaining, generating, importing, exporting, modifying, and removing objects 1120. Objects 1120 can include three-dimensional objects that can be spatially transformed, as explained earlier. In addition, the image and object manager 1106 can generate and manage object masks that correspond to objects, as described previously. As shown, one or more of the objects 1120 are stored by the storage manager 1116.

As shown, the image composite system 1104 includes the generative adversarial network 1108. As explained above, in one or more embodiments, the generative adversarial network 1108 is a spatial transformer-generative adversarial network (ST-GAN) made up of a spatial transformer network (STN), which is a specialized type of convolutional neural network and an adversarial network. Thus, as shown, the generative adversarial network 1108 includes the geometric prediction neural network 1110 and the adversarial discrimination neural network 1112. In various embodiments, the generative adversarial network 1108 is a Wasserstein generative adversarial network (WGAN).

The image composite system can train the geometric prediction neural network 1110 using supervised or unsupervised training, as described above. For instance, the image composite system employs paired perturbed images to train the geometric prediction neural network. Additionally, or alternatively, the image composite system employs the adversarial discrimination neural network 1112 to train the geometric prediction neural network 1110.

The geometric prediction neural network 1110 trains to determine or predict warp parameters 1122 (e.g., a homograph transformation matrix) for foreground objects to be composited in background images. To illustrate, upon receiving a foreground object and a background image, the trained geometric prediction neural network 1110 determines warp parameters 1122 that spatially transform and geometrically correct the foreground object to naturally fit to the background image, as previously described.

As also described above, the adversarial discrimination neural network 1112 trains using real images of naturally placed objects within background scenes to learn to classify input images as real or fake (e.g., realistic or non-realistic). The classification of the adversarial discrimination neural network 1112 is iteratively provided back to the geometric prediction neural network 1110 and the adversarial discrimination neural network 1112 via back propagation in a sequential end-to-end manner, as described above, to train both the geometric prediction neural network 1110 and the adversarial discrimination neural network 1112 until the generative adversarial network converges.

In addition, the image composite system 1104 includes the image compositor 1114. The image compositor 1114 applies the warp parameters 1122 to an inputted foreground object to generate a warped foreground object. Further, as described above, the image compositor 1114 composites the warped foreground object with the inputted background image to generate a composite image. The image compositor 1114, in one or more embodiments, provides the composite image as output.

Each of the components 1106-1122 of the image composite system 1104 can include software, hardware, or both. For example, the components 1106-1122 can include one or more instructions stored on a computer-readable storage medium and executable by processors of one or more computing devices, such as a client device or server device. When executed by the one or more processors, the computer-executable instructions of the image composite system 1104 can cause the computing device(s) to perform the feature learning methods described herein. Alternatively, the components 1106-1122 can include hardware, such as a special-purpose processing device to perform a certain function or group of functions. Alternatively, the components 1106-1122 of the image composite system 1104 can include a combination of computer-executable instructions and hardware.

Furthermore, the components 1106-1122 of the image composite system 1104 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 1106-1122 may be implemented as a stand-alone application, such as a desktop or mobile application. Furthermore, the components 1106-1122 may be implemented as one or more web-based applications hosted on a remote server. The components 1106-1122 may also be implemented in a suite of mobile device applications or "apps." To illustrate, the components 1106-1122 may be implemented in an application, including but not limited to ADOBE® INDESIGN®, ADOBE ACROBAT®, ADOBE® ILLUSTRATOR®, ADOBE PHOTOSHOP®, ADOBE® CREATIVE CLOUD® software. "ADOBE," "INDESIGN" "ACROBAT," "ILLUSTRATOR," "PHOTOSHOP," and "CREATIVE CLOUD" are either registered trademarks or trademarks of Adobe Systems Incorporated in the United States and/or other countries.

Figure 12:
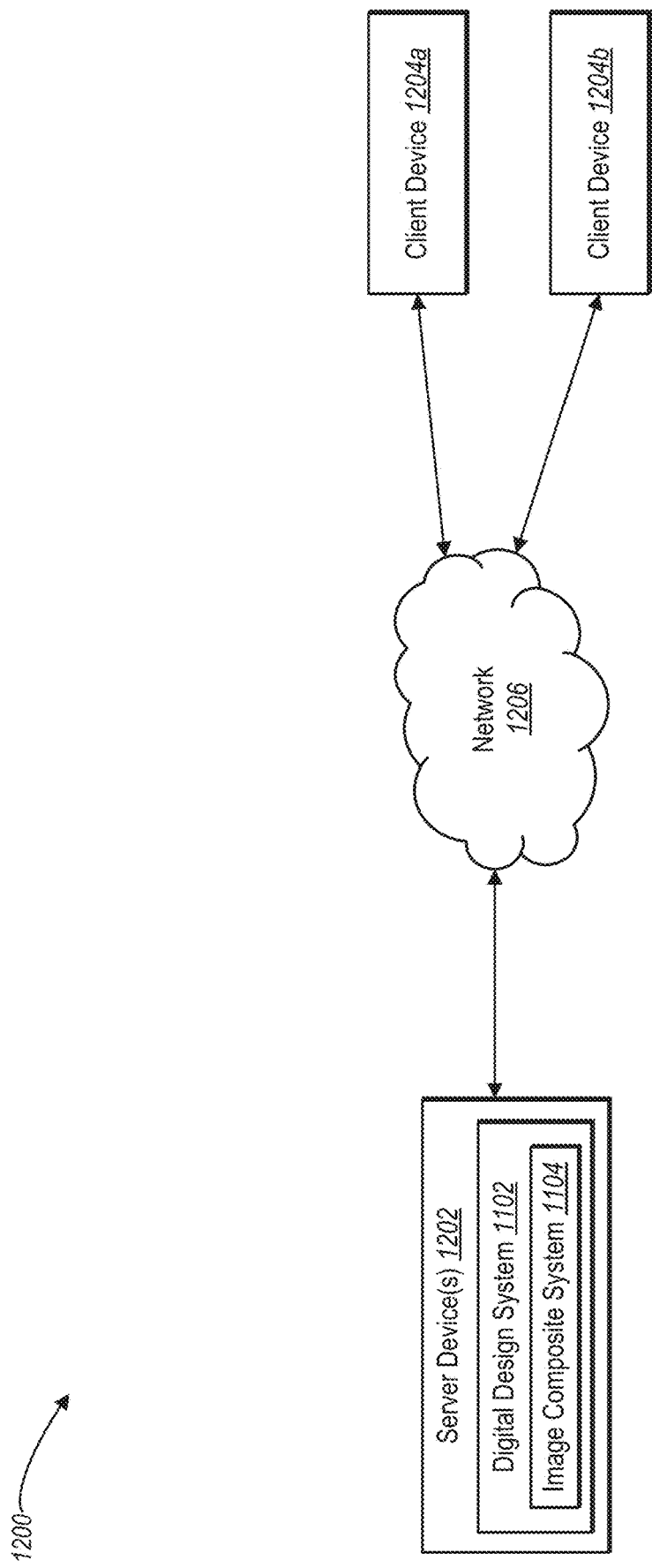
FIG. 12 illustrates a schematic diagram of an exemplary environment in which the image composite system may be implemented in accordance with one or more embodiments.

FIG. 12 illustrates a schematic diagram of an environment 1200 in which the image composite system 1104 may be implemented in accordance with one or more embodiments. In one or more embodiments, the environment 1200 includes various computing devices including server device(s) 1202 and one or more client devices 1204a, 1204b. In addition, the environment 1200 includes a network 1206. The network 1206 may be any suitable network over which the computing devices can communicate. Example networks are discussed in more detail below with regard to FIG. 17.

As illustrated in FIG. 12, the environment 1200 includes the server device(s) 1202, which may comprise any computing device, such as one or more of the computing devices described below in relation to FIG. 17. In addition, the server device(s) 1202 includes the digital design system 1102 and the image composite system 1104, which are described previously. For example, as described above, the image composite system 1104 can train and apply a generative adversarial network to generate geometrically correct composite images.

In addition, the environment 1200 includes the one or more client devices 1204a, 1204b. The client devices 1204a, 1204b may comprise any computing device, such as the one or more of the computing devices described below in relation to FIG. 17. As described above, the one or more client devices 1204a, 1204b can employ a trained geometric prediction neural network to generate composite images.

As illustrated, in one or more embodiments, the server device(s) 1202 can include all, or a portion of, the image composite system 1104. In particular, the image composite system 1104 can comprise an application running on the server device(s) 1202 or a portion of a software application that can be downloaded from the server device(s) 1202. For example, the image composite system 1104 can include a web hosting application that allows a client device 1204a to interact with content hosted on the server device(s) 1202.

To illustrate, in one or more embodiments of the environment 1200, the client device 1204a accesses a web page supported by the server device(s) 1202. In particular, the client device 1204a can run an application to allow a user to access, view, select, create, and/or modify composite images within a web page or website hosted at the server device(s) 1202 (e.g., a web page enables a user to provide a foreground object and background image, and receive, from the server, a geometrically correct composite image).

Although FIG. 12 illustrates a particular arrangement of the server device(s) 1202, the client devices 1204a, 1204b and the network 1206, various additional arrangements are possible. For example, while FIG. 12 illustrates the one or more client devices 1204a, 1204b communicating with the server device(s) 1202 via the network 1206, in one or more embodiments a single client device may communicate directly with the server device(s) 1202, bypassing the network 1206.

Similarly, although the environment 1200 of FIG. 12 is depicted as having various components, the environment 1200 may have additional or alternative components. For example, the image composite system 1104 can be implemented on multiple computing devices. In particular, the image composite system 1104 may be implemented in whole by the server device(s) 1202 or the image composite system 1104 may be implemented in whole by the client device 1204a. Alternatively, the image composite system 1104 may be implemented across multiple devices or components (e.g., utilizing the server device(s) 1202 and the one or more client devices 1204a, 1204b).

Figure 14:
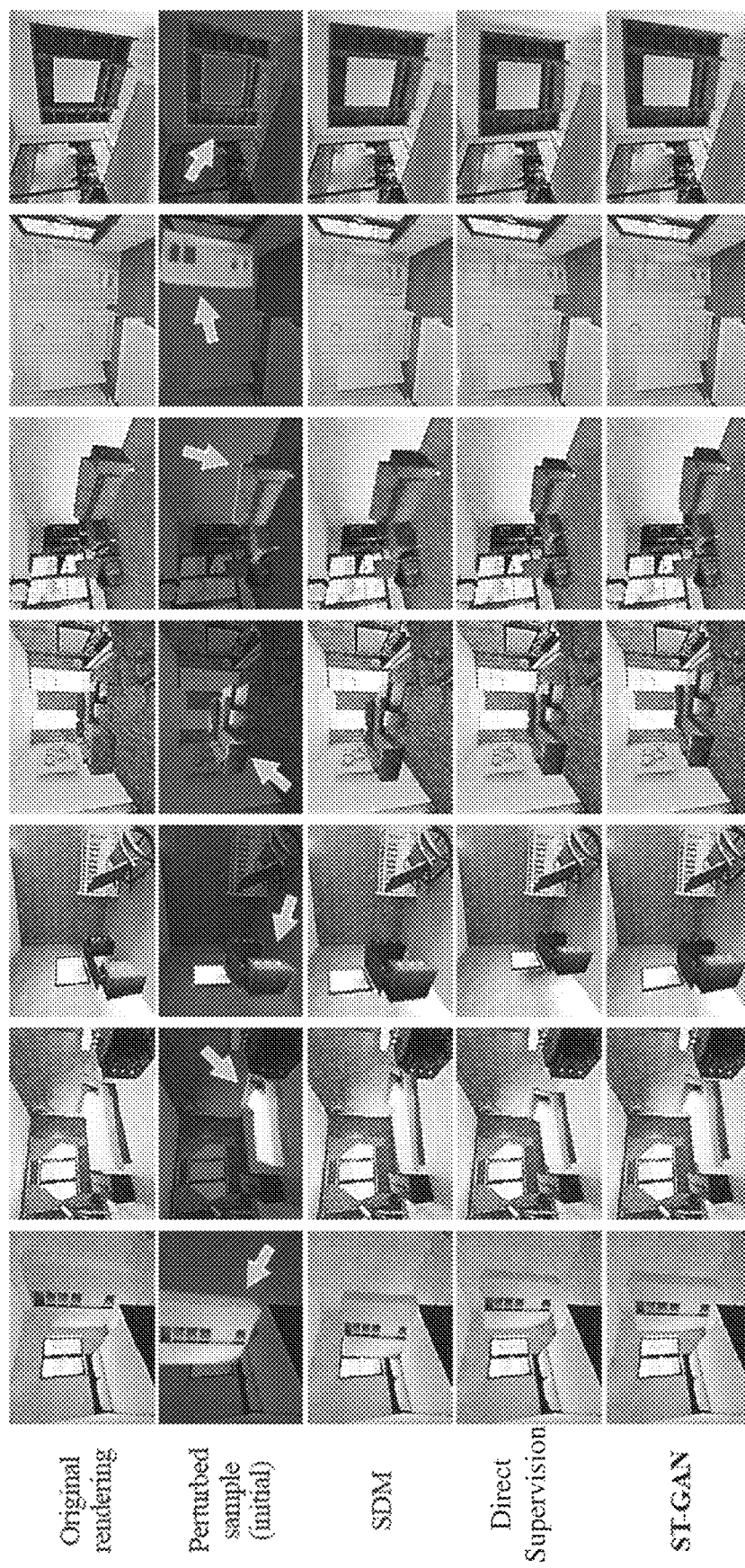

Turning now to FIGS. 13 and 14, additional detail is provided with respect to experimental results of the image composite system described herein. In particular, FIG. 13 illustrates a table of results between an experiment performed by researchers comparing embodiments of the image composite system described herein (e.g., shown as ST-GAN) and conventional systems (e.g., Supervised Decent Method (SDM), Direct Supervision) as well as the ground truth. FIG. 14 illustrates visual results of the image experiment mentioned above.

As an overview of the experiment, researchers began by establishing various parameters. For example, with respect to warp parameterizations, the researchers parameterized a homography with the $\mathfrak{sl}(3)$ Lie algebra (i.e., the warp parameters $p \in \mathfrak{sl}(3)$ and homography matrices $H \in \mathbb{SL}(3)$ are related through the exponential map). Additionally, under this parameterization, warp compositions can be expressed as the addition of parameters (i.e., $p_a \cdot p_b \equiv p_a + p_b$ for all $p_a, p_b \in \mathfrak{sl}(3)$).

With respect to the model architecture, researchers denoting the following: C(k) is a 2D convolutional layer with k filters of size 4×4 and stride 2 (halving the feature map resolution) and L(k) is a fully-connected layer with k output nodes. The input of the generators $G_i$ has 7 channels: RGBA for foreground and RGB for background, and the input to the Discriminator D is the composite image with 3 channels (RGB). All images are rescaled to 120×160, but, as noted above, the warp parameters can be applied to any resolution, including full-resolution images.

In addition, the architecture of Generators G has layers C(32)-C(64)-C(128)-C(256)-C(512)-L(256)-L(8), where the output is the 8-dimensional (in the case of a homography) warp parameter update $\Delta p$. For each convolutional layer in Generators G, the researchers caused the image composite system to concatenate a down-sampled version of the original image (using average pooling) with the input feature map. For the Discriminator D, the researchers used a PatchGAN architecture, with layout layers C(32)-C(64)-C(128)-C(256)-C(512)-C(1). In addition, nonlinearity activations were inserted between all layers, such as ReLU for Generators G and LeakyReLU with slope 0.2 for Discriminator D. Further, for the experiment, the researchers omitted all normalization layers, which were found to deteriorate training performance.

For the experiment, the researchers first tested the validity of whether the ST-GANs determined geometric corrections in a simple artificial setting. To illustrate, the researchers created a synthetic dataset consisting of a three-dimensional rectangular room, an axis-aligned cube inside the room, and a perspective camera. They then applied random 3-DoF (degrees of freedom) translations to the cube and 6-DoF perturbations to the camera, and rendered the cube/room pair separately as the foreground/background (of resolution 120× 160).

Next, the researchers warped the rendered foreground cubes with random homography transformations using the initial warp $p_0$ and trained the ST-GAN by pairing the original cube as the ground-truth counterpart for Discriminator D. The result was that the ST-GAN was able to correct the perturbed cubes scale and perspective distortion with respect to the underlying scene geometry. As mentioned previously, the researchers confirmed that the ST-GAN occasionally provided multi-modal results (more than one realistic solution that does not necessarily align back to the ground-truth location. Indeed, the ST-GAN was able to learn a multi-modal distribution of correct cube placements based on the provided dataset.

Upon confirming the validity of the ST-GAN to determine correct geometric transformations, the researchers compared the ST-GAN to conventional systems. To perform the comparison, the researchers selected a common image compositing domain (e.g., compositing furniture in indoor scenes based on both simulated and real-world images). To collect training data, the researchers created a synthetic dataset consisting of rendered background scenes and foreground objects with masks. In addition, they gathered real-world high-resolution photographs.

More particularly, regarding data preparation, the researchers rendered synthetic indoor scene images from the SUNCG dataset, which consisted of 45,622 indoor scenes with over 5 million three-dimensional object instances from 37 NYUv2 categories. In addition, the researchers used the selected 41,499 scene models as well as the 568,749 camera viewpoints as well as Mitsuba, as described above, to render photo-realistic images with global illumination. For example, the researchers employ an employed a rendering pipeline similar to the image generation pipeline described in connection with FIG. 5 above.

Further, the researchers randomly sampled an object from a list of objects and an associated camera viewpoint. To emulate an occlusion-free compositing scenario, the researchers had the image composite system automatically remove occlusions by detecting overlapping object masks rendered from the camera. They then rendered one image with the candidate object present (as the "real" sample) and one with it removed (as the background image). In addition, they perturbed the 6-DoF camera pose and rendered the object as well as a corresponding mask (e.g., the foreground object) for compositing. In this manner, the researchers obtained a rendered object as viewed from a perturbed camera perspective. As a note, the a homography correction applied by the researchers can only approximate a three-dimensional perturbation. As such, no ground truth warp parameters were obtained to use for supervision.

Using the generated dataset of images, the researchers trained the ST-GAN for N=4 sequential warps. During the adversarial training, the researchers rescaled the foreground object randomly from Unif(0.9, 1.1) and augmented the initial warp $p_0$ with a translation sampled from N (0, 0.05) scaled by the image dimensions. The researchers also set $\lambda_{update}=0.3$ for all methods.

Regarding the baseline used for testing, the researchers compared the ST-GAN against self-supervised approaches trained with random homography perturbations on foreground objects as input, yielding ground truth warp parameters serving as self-supervision. Notably, the ST-GAN disclosed herein does not require known ground truth warp parameters for supervision, but instead uses "realism" via the Discriminator D to train the Generator G. In contrast, conventional systems require supervision directly on the warp parameters.

More particularly, the researchers compared the ST-GAN against (1) a supervised descent method (SDM), which greedily learns the parameters through cascaded linear regression and (2) Direct Supervision (e.g., HomographyNet), which is a CNN-based approach that learns direct regression on the warp parameters. With respect to the SDM baseline, the researchers trained the model based on 4 sequential warps.

The goal for each of the tests was to generate realistic composite images. Because natural quantitative results are difficult to accurately evaluate, the researchers provided sample composite images from each system to human evaluators (e.g., via the Amazon Mechanical Turk (AMT)). In particular, the researchers randomly chose 50 test images from various categories and gather data from 225 evaluators. Each evaluator was shown a composite image from a randomly selected algorithm and was asked whether they saw any objects whose shape looks unnatural in the presented image. The quantitative results of the human evaluators are shown in the table in FIG. 13.

As shown in FIG. 13, on average, the ST-GAN shows a large improvement of geometric realism, and quality improves over the sequential warps. When considering that the warp is restricted to homography transformations, the researchers found the results promising, as the ST-GAN is not correcting for more complicated view synthesis effects for out-of-plane rotations such as occlusions. Additionally, as shown, the ST-GAN, which does not require ground truth warp parameters during training, greatly outperformed other baselines, while SDM yielded no improvement and Direct Supervision increased realism, but to a lesser degree.

Notably, in FIG. 13, the percentages represent the how often the images in each category were classified as "real" by the evaluators. As shown, the end-to-end trained ST-GAN provides substantial improvements of geometric realism when averaged across all classes. Further, as shown, the performance of the ST-GENERATIVE ADVERSARIAL NETWORK largely improves as the number of warp iterations increases as well as after the end-to-end training. As another note, the ground truth in FIG. 13 serves as the theoretical upper bounds for each of the categories and methods.

Regarding qualitative results, FIG. 14 shows how the ST-GAN generated composite images compared to the other baselines of SDM and Direct Supervision. As shown in FIG. 14, the ST-GAN visually outperforms both baselines trained with direct homography parameter supervision, which further confirms the results shown in the table in FIG. 13.

In addition, the researchers found that the ST-GAN performed well in interactive user settings. For example, upon a user providing an initial location of a foreground object or as the user dragged a foreground object across a background image, the ST-GAN recognized the different perspective and "snapped" the object to the location within the scene where the object would frequently be composited (e.g., place a bookshelf along a wall). Indeed, the ST-GAN learned to determine warp parameters that predicts a most likely composite location given a neighborhood of initial locations, which the ST-GAN automatically learned from training.

FIGS. 1-14, the corresponding text, and the examples provide a number of different methods, systems, devices, and non-transitory computer-readable media of the image composite system. In addition to the foregoing, one or more embodiments can also be described in terms of flowcharts comprising acts for accomplishing a particular result. For example, FIG. 15 and FIG. 16 may be performed with more or fewer acts. Further, the acts may be performed in differing orders. Additionally, the acts described herein may be repeated or performed in parallel with one another or parallel with different instances of the same or similar acts.

Figure 15:
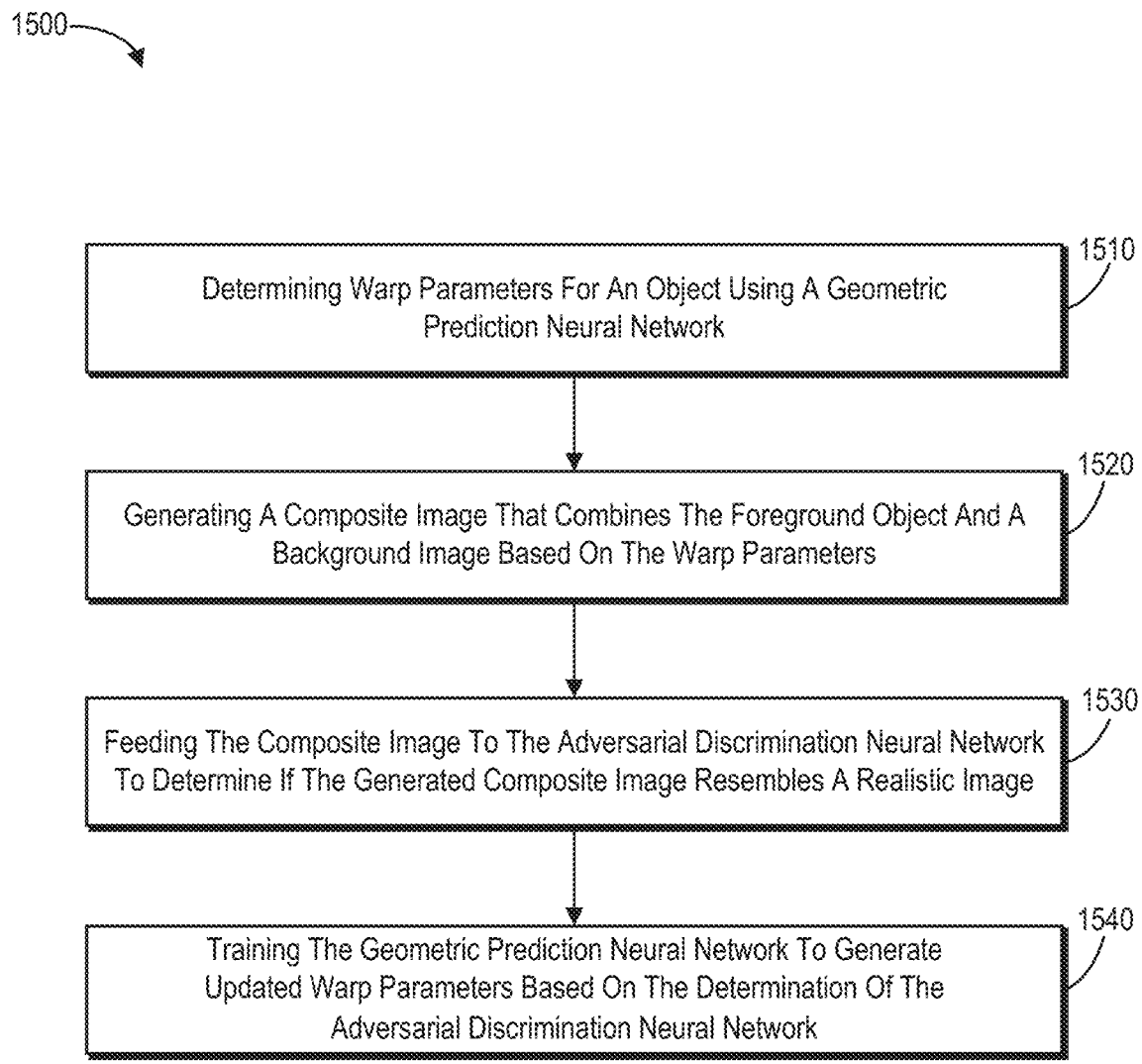
FIG. 15 illustrates a flowchart of a series of acts for training a geometric prediction neural network using an adversarial discrimination neural network to determine geometrically correct warp parameters in accordance with one or more embodiments.

As mentioned, FIG. 15 illustrates a flowchart of a series of acts 1500 for training a geometric prediction neural network using an adversarial discrimination neural network to determine geometrically correct warp parameters. While FIG. 15 illustrates acts according to one embodiment, alternative embodiments may omit, add to, reorder, and/or modify any of the acts shown in FIG. 15. The acts of FIG. 15 can be performed as part of a method. Alternatively, a non-transitory computer-readable medium can comprise instructions that, when executed by one or more processors, cause a computing device to perform the acts of FIG. 15. In some embodiments, a system can perform the acts of FIG. 15.

In one or more embodiments, the series of acts 1500 is implemented on one or more computing devices, such as the computing device 1100 or the client device 1204a. In addition, in some embodiments, the series of acts 1500 is implemented in a digital environment for creating or editing digital content. For example, the series of acts 1500 is implemented on a computing device having memory that includes a geometric prediction neural network and an adversarial discrimination neural network that distinguishes realistic images from non-realistic images.

The series of acts 1500 includes an act 1510 of determining warp parameters for an object using a geometric prediction neural network. In particular, the act 1510 can involve determining warp parameters for a foreground object to be composited with a background image using the geometric prediction neural network. In some embodiments, the geometric prediction neural network is a spatial transformer convolutional neural network. In various embodiments, the geometric prediction neural network includes a generator network that generates composite images by combining images with foreground objects and corresponding object masks to background images based on determined generated warp parameters. In one or more embodiments, the adversarial discrimination neural network includes a discriminator network that determines if the generated composite images resemble realistic images. In additional embodiments, the geometric prediction neural network and the adversarial discrimination neural network form a spatial transformer-generative adversarial network (ST-GAN).

As shown, the series of acts 1500 also includes an act 1520 of generating a composite image that combines the foreground object and a background image based on the warp parameters.

In particular, the act 1520 can involve generating a composite image that combines the foreground object and a corresponding object mask to the background image based on the determined warp parameters. In one or more embodiments, the corresponding object mask isolates the foreground object from other portions of a foreground image. In various embodiments, the act 1520 includes applying the warp parameters computed for the foreground object in low-dimensional space to a higher-resolution version of the foreground object generating the composite image to combine the higher-resolution version of the foreground object and the corresponding object mask to a higher-resolution version of the background image.

As shown in FIG. 15, the series of acts 1500 further includes an act 1530 of feeding the composite image to the adversarial discrimination neural network to determine if the generated composite image resembles a realistic image. In particular, the act 1530 can include feeding the generated composite image to the adversarial discrimination neural network to determine if the generated composite image resembles a realistic image including a naturally placed foreground object and a background. In one or more embodiments, the act 1530 is based on training the adversarial discrimination neural network based on a plurality of real training images including real images having foreground objects naturally placed within backgrounds to learn to classify input images as realistic or non-realistic.

As shown, the series of acts 1500 also includes an act 1540 of training the geometric prediction neural network to generate updated warp parameters based on the determination of the adversarial discrimination neural network. In one or more embodiments, the act 1540 includes training the geometric prediction neural network by propagating back the determination of the adversarial discrimination neural network to the geometric prediction neural network when the generated composite image is determined to not resemble a realistic image. In additional embodiments, the act 1540 includes training the adversarial discrimination neural network by propagating back the determination of the adversarial discrimination neural network to itself when the generated composite image is determined to resemble a realistic image.

The series of acts 1500 can also include a number of additional acts. In one or more embodiments, the series of acts 1500 includes the acts of sequentially training the geometric prediction neural network and the adversarial discrimination neural network, using a minimax loss function, until the spatial transformer-generative adversarial network converges. In additional embodiments, the series of acts 1500 includes the acts of training the geometric prediction neural network using unsupervised data including the composite image and the plurality of training images.

In some embodiments, the series of acts 1500 includes the act of generating updated warp parameters to improve the spatial geometry of the foreground object with respect to the background image. In one or more embodiments, the series of acts 1500 includes the act of constraining the warp parameters to reside within a trust region of the background image by employing penalties within an objective function of the geometric prediction neural network.

Figure 16:
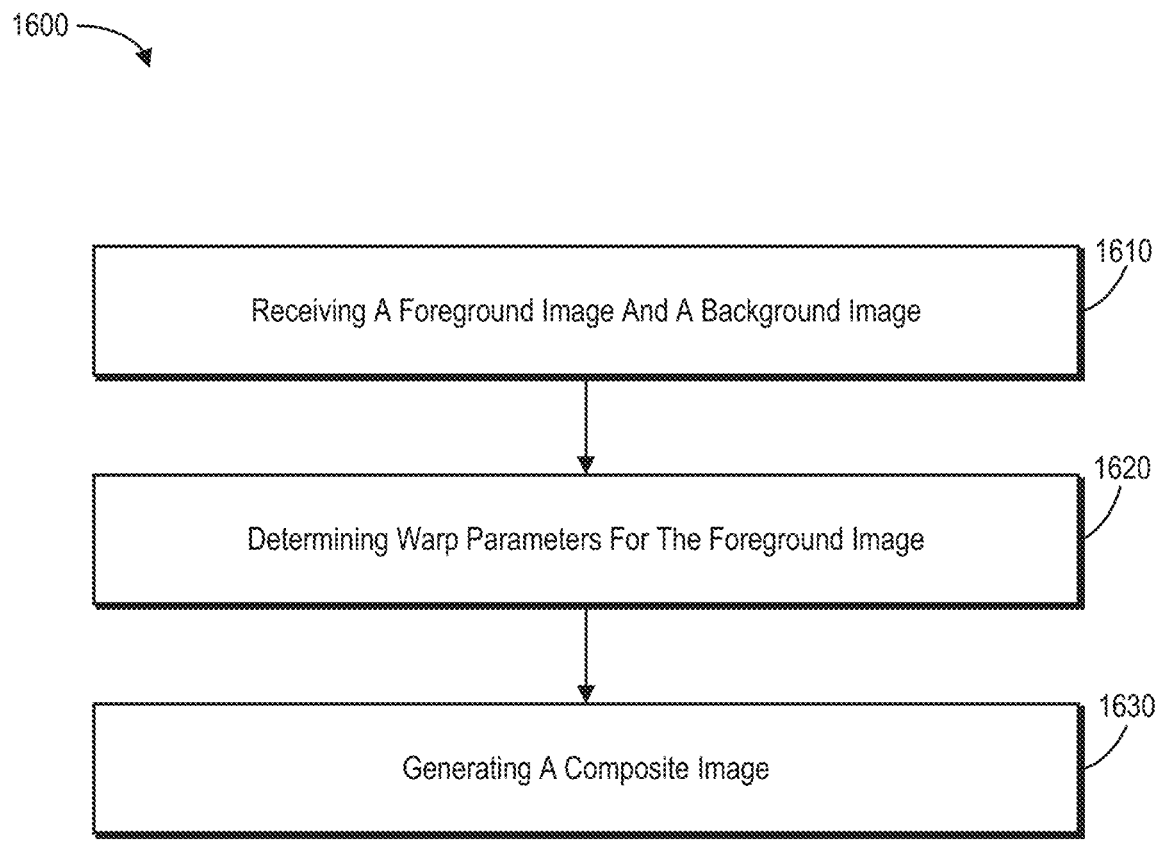
FIG. 16 illustrates a flowchart of a series of acts for generating a composite image using a geometric prediction neural network in accordance with one or more embodiments.

As mentioned previously, FIG. 16 illustrates a flowchart of a series of acts 1600 for generating a composite image using a geometric prediction neural network in accordance with one or more embodiments. While FIG. 16 illustrates acts according to one embodiment, alternative embodiments may omit, add to, reorder, and/or modify any of the acts shown in FIG. 16. The acts of FIG. 16 can be performed as part of a method. Alternatively, a non-transitory computer-readable medium can comprise instructions that, when executed by one or more processors, cause a computing device to perform the acts of FIG. 16. In one or more embodiments, a system can perform the acts of FIG. 16. In some embodiments, the series of acts 1600 is implemented by a computing system on one or more computing devices, such as the computing device 1100 or the client device 1204a.

As shown, the series of acts 1600 includes an act 1610 of receiving a foreground image and a background image. In particular, the act 1610 of receiving a foreground object image of a three-dimensional foreground. In one or more embodiments, the act 1610 includes receiving a foreground object, foreground image, and/or background image from a user and/or an application. In some embodiments, the background image is captured by a client device associated with the user. In various embodiments, the foreground image is a two-dimensional image.

As shown, the series of acts 1600 also includes an act 1620 of determining warp parameters for the foreground image. In particular, the act 1620 can involve determining warp parameters for the foreground image using a geometric prediction neural network adversarially trained to distinguish realistic images. For example, the act 1620 includes training the geometric prediction neural network using an adversarial discrimination neural network that distinguishes real images from non-real images.

As shown, the series of acts 1600 includes an act 1630 of generating a composite image. In particular, the act 1630 can involve generating a composite image by compositing the foreground image to the background image based on the determined warp parameters. In some embodiments, the warp parameters correct the spatial geometry of the foreground image with respect to the background image such that the foreground image within the composite image appears naturally placed within the background image. In various embodiments, the act 1630 includes initially positioning the foreground image with respect to the background image based on user input before determining warp parameters for the foreground image.

In various embodiments, the series of acts 1600 can also include a number of additional acts. For example, the series of acts 1600 includes the acts of feeding the composite image to an adversarial discrimination neural network to determine if the composite image resembles a realistic image including a naturally placed foreground object and a background; and updating, based on the composite image not resembling a realistic image, the warp parameters for the foreground image using the geometric prediction neural network until the adversarial discrimination neural network determines that the composite image resembles a realistic image The term "digital environment," as used herein, generally refers to an environment implemented, for example, as a stand-alone application (e.g., a personal computer or mobile application running on a computing device), as an element of an application, as a plug-in for an application, as a library function or functions, as a computing device, and/or as a cloud-computing system. A digital medium environment allows the image composite system to adversarially train and employ a generative adversarial network, as described herein.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 17:
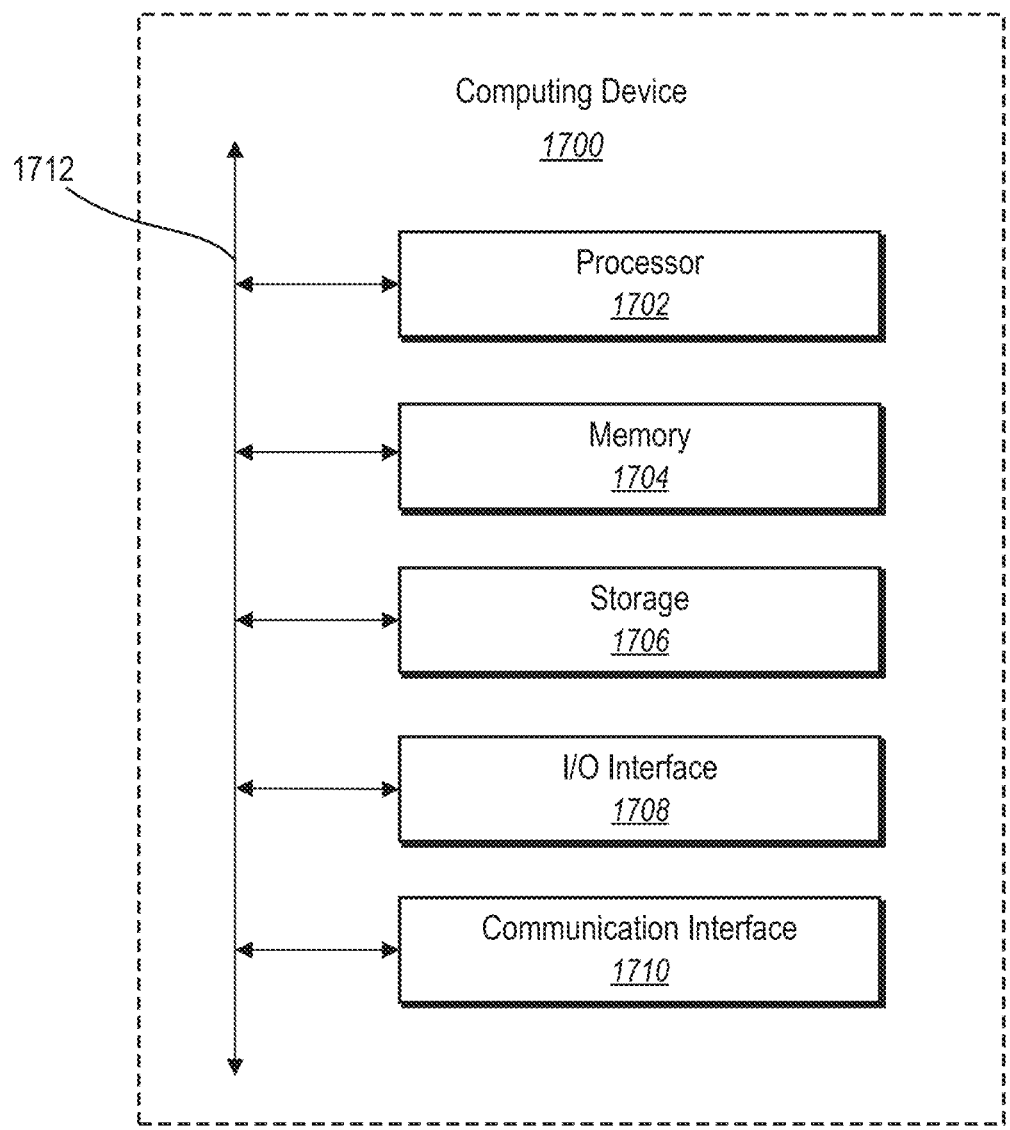
FIG. 17 illustrates a block diagram of an exemplary computing device for implementing one or more embodiments of the present disclosure.

FIG. 17 illustrates a block diagram of an exemplary computing device 1700 that may be configured to perform one or more of the processes described above. One will appreciate that one or more computing devices, such as the computing device 1700 may represent the computing devices described above (e.g., computing device 1100, server device(s) 1202, and client devices 1204a-b). In one or more embodiments, the computing device 1700 may be a mobile device (e.g., a laptop, a tablet, a smartphone, a mobile telephone, a camera, a tracker, a watch, a wearable device, etc.). In some embodiments, the computing device 1700 may be a non-mobile device (e.g., a desktop computer or another type of client device). Further, the computing device 1700 may be a server device that includes cloud-based processing and storage capabilities.

As shown in FIG. 17, the computing device 1700 can include one or more processor(s) 1702, memory 1704, a storage device 1706, input/output ("I/O") interfaces 1708, and a communication interface 1710, which may be communicatively coupled by way of a communication infrastructure (e.g., bus 1712). While the computing device 1700 is shown in FIG. 17, the components illustrated in FIG. 17 are not intended to be limiting. Additional or alternative components may be used in other embodiments. Furthermore, in certain embodiments, the computing device 1700 includes fewer components than those shown in FIG. 17. Components of the computing device 1700 shown in FIG. 17 will now be described in additional detail.

In particular embodiments, the processor(s) 1702 includes hardware for executing instructions, such as those making up a computer program. As an example, and not by way of limitation, to execute instructions, the processor(s) 1702 may retrieve (or fetch) the instructions from an internal register, an internal cache, memory 1704, or a storage device 1706 and decode and execute them.

The computing device 1700 includes memory 1704, which is coupled to the processor(s) 1702. The memory 1704 may be used for storing data, metadata, and programs for execution by the processor(s). The memory 1704 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1704 may be internal or distributed memory.

The computing device 1700 includes a storage device 1706 includes storage for storing data or instructions. As an example, and not by way of limitation, the storage device 1706 can include a non-transitory storage medium described above. The storage device 1706 may include a hard disk drive (HDD), flash memory, a Universal Serial Bus (USB) drive or a combination these or other storage devices.

As shown, the computing device 1700 includes one or more I/O interfaces 1708, which are provided to allow a user to provide input to (such as user strokes), receive output from, and otherwise transfer data to and from the computing device 1700. These I/O interfaces 1708 may include a mouse, keypad or a keyboard, a touch screen, camera, optical scanner, network interface, modem, other known I/O devices or a combination of such I/O interfaces 1708. The touch screen may be activated with a stylus or a finger.

The I/O interfaces 1708 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1708 are configured to provide graphical data to a display for presentation to a user. The graphical data may be representative of one or more graphical user interfaces and/or any other graphical content as may serve a particular implementation.

The computing device 1700 can further include a communication interface 1710. The communication interface 1710 can include hardware, software, or both. The communication interface 1710 provides one or more interfaces for communication (such as, for example, packet-based communication) between the computing device and one or more other computing devices or one or more networks. As an example, and not by way of limitation, communication interface 1710 may include a network interface controller (MC) or network adapter for communicating with an Ethernet or other wire-based network or a wireless NIC (WNIC) or wireless adapter for communicating with a wireless network, such as a WI-FI. The computing device 1700 can further include a bus 1712. The bus 1712 can include hardware, software, or both that connects components of computing device 1700 to each other.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A system for training a neural network to create realistic geometric corrections for image compositing using adversarial training comprising:
   a memory comprising:
      a geometric prediction neural network for determining warp points of foreground objects to automatically align to geometric perspective of corresponding background images; and
      an adversarial discrimination neural network that distinguishes realistic images from non-realistic images;
   at least one processor; and
   at least one non-transitory computer-readable storage medium storing instructions that, when executed by the at least one processor, cause the system to:
      determine warp parameters for a foreground object to be composited with a background image using the geometric prediction neural network by iteratively generating the warp parameters to, when combined across the iterations, spatially transform the foreground object to automatically align with a geometric perspective of the background image;
      generate a composite image that combines the foreground object and a corresponding object mask to the background image based on the determined warp parameters;
      feed the generated composite image to the adversarial discrimination neural network to determine if the generated composite image resembles a realistic image comprising a naturally placed foreground object and a background; and
      train the geometric prediction neural network to generate updated warp parameters based on the determination of the adversarial discrimination neural network.

2. The system of claim 1, further comprising instructions that, when executed by the at least one processor, cause the system to train the geometric prediction neural network by propagating back the determination of the adversarial discrimination neural network to the geometric prediction neural network when the generated composite image is determined to not resemble a realistic image.

3. The system of claim 2, further comprising instructions that, when executed by the at least one processor, cause the system to train the adversarial discrimination neural network by propagating back the determination of the adversarial discrimination neural network to the adversarial discrimination neural network when the generated composite image is determined to resemble a realistic image.

4. The system of claim 1, wherein:
the geometric prediction neural network is a spatial transformer convolutional neural network;
the geometric prediction neural network comprises a generator network that generates composite images by combining images with foreground objects and corresponding object masks to background images based on determined generated warp parameters;
the adversarial discrimination neural network comprises a discriminator network that determines if the generated composite images resemble realistic images; and
the geometric prediction neural network and the adversarial discrimination neural network form a spatial transformer-generative adversarial network (ST-GAN).

5. The system of claim 4, further comprising instructions that, when executed by the at least one processor, cause the system to sequentially train the geometric prediction neural network and the adversarial discrimination neural network, using a minimax loss function, until the spatial transformer-generative adversarial network converges.

6. The system of claim 1, further comprising instructions that, when executed by the at least one processor, cause the system to train the adversarial discrimination neural network based on a plurality of real training images comprising real images having foreground objects naturally placed within backgrounds.

7. The system of claim 6, wherein the instructions further cause the system to train the geometric prediction neural network using unsupervised data comprising the composite image and the plurality of training images.

8. The system of claim 1, further comprising instructions that, when executed by the at least one processor, cause the system to iteratively generate updated warp parameters to improve spatial geometry of the foreground object with respect to the background image.

9. The system of claim 1, further comprising instructions that, when executed by the at least one processor, cause the system to constrain the warp parameters to reside within a trust region of the background image by employing penalties within an objective function of the geometric prediction neural network.

10. The system of claim 1, further comprising instructions that, when executed by the at least one processor, cause the system to apply the warp parameters computed for the foreground object in low-dimensional space to a higher-resolution version of the foreground object before generating the composite image to combine the higher-resolution version of the foreground object and the corresponding object mask to a higher-resolution version of the background image.

11. A non-transitory computer-readable medium storing instructions that, when executed by at least one processor, cause a computer system to:
receive a foreground image of a foreground object and a background image;
determine warp parameters for the foreground image using a geometric prediction neural network adversarially trained to distinguish realistic images by the geometric prediction neural network iteratively generating the warp parameters to, when combined across the iterations, spatially transform the foreground object to automatically align with a geometric perspective of the background image; and
generate a composite image by compositing the foreground image to the background image based on the determined warp parameters.

12. The non-transitory computer-readable medium of claim 11, further comprising instructions that, when executed by the at least one processor, cause the computer system to initially position the foreground image with respect to the background image based on user input before determining warp parameters for the foreground image.

13. The non-transitory computer-readable medium of claim 11, wherein the warp parameters correct the spatial geometry of the foreground image with respect to the background image such that the foreground image within the composite image appears naturally placed within the background image.

14. The non-transitory computer-readable medium of claim 11, further comprising instructions that, when executed by the at least one processor, cause the computer system to:
feed the composite image to an adversarial discrimination neural network to determine if the composite image resembles a realistic image comprising a naturally placed foreground object and a background; and
update, based on the composite image not resembling a realistic image, the warp parameters for the foreground image using the geometric prediction neural network until the adversarial discrimination neural network determines that the composite image resembles a realistic image.

15. A non-transitory computer-readable medium storing instructions that, when executed by at least one processor, cause a computer system to:
utilizing geometric prediction neural network to iteratively determine a plurality of warp parameters for a foreground object to be composited with a background image
combine to the plurality of warp parameters to spatially transform the foreground object to align with a geometric perspective of the background image;
generate a composite image that comprises the foreground object spatially transform based on the combined plurality of warp parameters with the background image;
feed the generated composite image to an adversarial discrimination neural network to determine that the generated composite image does not resembles a realistic image comprising a naturally placed foreground object and a background; and
train the geometric prediction neural network to generate an updated plurality of warp parameters based on the determination of the adversarial discrimination neural network.

16. The non-transitory computer-readable medium of claim 15, further comprising instructions that, when executed by the at least one processor, cause the computer system to further train the geometric prediction neural network by utilizing supervisory training based on ground truth warp parameters corresponding to the foreground object.

17. The non-transitory computer-readable medium of claim 16, further comprising instructions that, when executed by the at least one processor, cause the computer system to train the geometric prediction neural network by
comparing the combined plurality of warp parameters of the composite image to the ground truth warp parameters corresponding to the foreground object; and
learning, based on the comparison, updated warp parameters for the foreground object.

18. The non-transitory computer-readable medium of claim 16, wherein the foreground object is a three-dimensional object.

19. The non-transitory computer-readable medium of claim 15, wherein the geometric prediction neural network generates the plurality of warp parameters without user manipulation corresponding to the background image.

20. The non-transitory computer-readable medium of claim 15, wherein the adversarial discrimination neural network that has been trained with real images comprising foreground objects within backgrounds to distinguish realistic images from non-realistic images to determine if the generated composite images resemble realistic images comprising naturally placed foreground objects within backgrounds.

* * * * *